(12) United States Patent
Akao et al.

(10) Patent No.: US 8,284,357 B2
(45) Date of Patent: Oct. 9, 2012

(54) RETARDATION PLATE, METHOD FOR MANUFACTURING THE RETARDATION PLATE, AND LIQUID CRYSTAL DISPLAY

(75) Inventors: Sosuke Akao, Tokyo (JP); Takao Taguchi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 26 days.

(21) Appl. No.: 12/923,616

(22) Filed: Sep. 29, 2010

(65) Prior Publication Data

US 2011/0025953 A1  Feb. 3, 2011

Related U.S. Application Data

(63) Continuation of application No. PCT/JP2008/072871, filed on Dec. 16, 2008.

(30) Foreign Application Priority Data

Mar. 31, 2008  (JP) .................................. 2008-093498
Jun. 24, 2008  (JP) .................................. 2008-164894

(51) Int. Cl.
*G02F 1/1335* (2006.01)

(52) U.S. Cl. ........................................ 349/117; 349/118

(58) Field of Classification Search ........................ None
See application file for complete search history.

(56) References Cited

U.S. PATENT DOCUMENTS

2007/0165165 A1* 7/2007 Joten .............................. 349/119

FOREIGN PATENT DOCUMENTS

| JP | 57-15620 | 3/1982 |
|----|----------|--------|
| JP | 59-40172 | 9/1984 |
| JP | 63-17102 | 4/1988 |
| JP | 63-305173 | 12/1988 |
| JP | 5-9469 | 2/1993 |
| JP | 2002-6138 | 1/2002 |
| JP | 2004-133179 | 4/2004 |
| JP | 2005-24919 | 1/2005 |
| JP | 2006-85130 | 3/2006 |
| JP | 2006-276397 | 10/2006 |
| JP | 2008-505369 | 2/2008 |
| JP | 2008-58612 | 3/2008 |

OTHER PUBLICATIONS

Machine translation of JP 2008-58612.*
International Preliminary Report on Patentability mailed Dec. 23, 2010 issued in corresponding International Patent Application No. PCT/JP2008/072871.
International Search Report for PCT/JP2008/072871, mailed Mar. 3, 2009.
Japanese Office Action mailed Jun. 12, 2012 issued in corresponding Japanese Patent Application No. 2010-505792.

* cited by examiner

*Primary Examiner* — Lucy Chien

(57) ABSTRACT

A retardation layer includes plurality of regions different in retardation. A retardation plate includes a substrate and a solidified liquid crystal layer supported by the substrate. The solidified liquid crystal layer is a continuous film made of a same material, and has biaxial optical anisotropy. The solidified liquid crystal layer includes plurality of regions, the regions being different in an in-plane retardation and a thickness direction retardation.

33 Claims, 6 Drawing Sheets

RETARDATION PLATE, METHOD FOR MANUFACTURING THE RETARDATION PLATE, AND LIQUID CRYSTAL DISPLAY

CROSS-REFERENCE TO RELATED APPLICATIONS

This is a Continuation Application of PCT Application No. PCT/JP2008/072871, filed Dec. 16, 2008, which was published under PCT Article 21(2) in Japanese.

This application is based upon and claims the benefit of priority from prior Japanese Patent Applications No. 2008-093498, filed Mar. 31, 2008; and No. 2008-164894, filed Jun. 24, 2008, the entire contents of both of which are incorporated herein by reference.

BACKGROUND OF THE INVENTION

1. Field of the Invention

The present invention relates to an optical technique that can be applied, for example, to a display such as liquid crystal display.

2. Description of the Related Art

Liquid crystal displays have characteristics of thin-shaped, lightweight and low power consumption. Thus, in recent years, their application to mobile devices and stationary equipments such as television receivers increases rapidly.

In order to make it possible for a liquid crystal display to display a multi-colored image, a color filter is utilized. For example, in a transmissive or reflective liquid crystal display that can display a multi-colored image, a color filter including red, green and blue coloring layers is utilized in most cases. On the other hand, in a semi-transparent liquid crystal display that can display a multi-colored image, a color filter including red, green and blue coloring layers for transmissive display and red, green and blue coloring layers for reflective display is utilized in most cases.

Many liquid crystal displays include a retardation layers. For example, in a liquid crystal display of a television receiver, a retardation layer is utilized in combination with a linearly polarizing film in order to display an image that can be easily recognized regardless of the viewing direction. On the other hand, in a reflective or semi-transparent liquid crystal display, an absorption-type circularly polarizing plate including a quarter-wave plate or a combination of a quarter-wave plate and a half-wave plate as a retardation layer is utilized in order to achieve an excellent visibility under a high-luminance light source such as sun.

However, in spite of the fact that the red, green and blue pixels are different in wavelength range of display color from one another, the retardation of a retardation layer is usually even throughout its surface. For this reason, it is difficult to adopt optimal designs into all the pixels different in display color.

In addition, each of the retardation of a liquid crystal layer and the retardation of a retardation layer has wavelength dispersion. For this reason, when employing a design for sufficiently compensating the retardation of a liquid crystal cell using a retardation layer at pixels that display a certain color, the retardation layer may insufficiently compensate the retardation of a liquid crystal cell at pixels that display other colors.

Furthermore, in the case where a quarter-wave plate, which causes a retardation by a quarter of a wavelength ($\lambda/4$) at a center wavelength of green wavelength range, for example, about 550 nm, is combined with a linearly polarizing plate to be used as a circularly polarizing plate, even when the refractive index anisotropy, i.e., birefringence $\Delta n$ of the quarter-wave plate is almost uniform throughout the wavelength range of visible rays, a retardation greater than $\lambda/4$ will be caused within a blue wavelength range having a center wavelength of, for example, about 450 nm. Also, a retardation smaller than $\lambda/4$ will be caused within a red wavelength range having a center wavelength of, for example, about 630 nm. Thus, when the circularly polarizing plate is irradiated with blue and red lights as natural lights, the transmitted light will be not a circularly polarized light but an elliptically polarized light. In fact, since the birefringence is greater on the short-wavelength's side of the visible range, i.e., within the blue wavelength range and is smaller on the long-wavelength's side of the visible range, i.e., within the red wavelength range, this problem is often more serious.

In view of the above-described problems, JP-A 2005-24919 and JP-A 2006-85130 propose as a retardation layer a solidified liquid crystal layer that includes regions having different thickness, i.e., regions causing different retardations.

Specifically, JP-A 2005-24919 describes that a color filter layer composed of red, green and blue coloring layers different in thickness is formed, and a solidified liquid crystal layer is formed on the color filter layer. The solidified liquid crystal layer is obtained by coating an alignment layer with a coating solution containing photo-polymerizing liquid crystal compound and irradiating the coated film with ultraviolet rays.

According to this method, due to the relief structure that the coloring layers produces on the surface of the color filter layer, a solidified liquid crystal layer thicker at a position of the thinner coloring layer and thinner at a position of the thicker coloring layer can be obtained. That is, a solidified liquid crystal layer different in thickness among pixels that displays different colors can be obtained. In other words, a solidified liquid crystal layer including regions that cause different retardations can be obtained.

JP-A 2006-85130 describes a semi-transparent liquid crystal display that includes a color filter layer and a solidified liquid crystal layer. In this liquid crystal display, each coloring layer of the color filter layer is thicker at the transmissive portions of pixels and thinner at the reflective portion of the pixels. That is, the surface of the color filter layer is provided with a relief structure. The solidified liquid crystal layer is obtained by forming a polyimide layer on the surface of the color filter layer provided with the relief structure, performing a rubbing process on the whole surface of the polyimide layer, coating the polyimide layer with ultraviolet-curing liquid crystal monomer, and irradiating the coated layer with ultraviolet rays. Alternatively, coating the surface of the color filter layer with a liquid crystal polymer and subjecting the whole of the coated film to a photo-alignment process obtain the solidified liquid crystal layer. The solidified liquid crystal layer thus obtained is thinner at the transmissive portions of pixels and thicker at the reflective portions of the pixels. That is, according to the method, a solidified liquid crystal layer that includes regions causing different retardations can be obtained.

However, according to the technique described in JP-A 2005-24919, it is necessary to accurately adjust the differences in thickness among the coloring layers. Similarly, according to the technique described in JP-A 2006-85130, it is necessary to accurately adjust the difference between the thickness of the coloring layer at the reflective portion and the thickness of the coloring layer at the transmissive portion. For this reason, when the above-described techniques are employed, the design for the color filter layer is limited or the degree of difficulty in manufacturing the color filter layer increases. Therefore, in order to achieve the design thickness at each region of the solidified liquid crystal layer, it is necessary to consider various factors such as flowability of a coating solution and a shrinkage ratio of the coated film.

JP-A 2008-505369 (KOHYO) proposes a biaxial oriented film having periodically varying local birefringence. The film described therein is a short pitch cholesteric film, and develops additional in-plane anisotropy ($\Delta n_{x-y}$) in the negative C-type structure, due to the helical strain. More specifically, a drawing indicates the development of an index ellipsoid which satisfies $n_x \neq n_y \neq n_z$, wherein $n_x$ and $n_y$ are greater than $n_z$, and has biaxial negative C-type symmetry.

According to the description, the film is produced by, for example, irradiating the material with linearly polarized light, preferably linearly polarized UV light to induce the photoreaction of a photosensitive compound in a selected region of the material. In the film, the helical structure is uniform, but the birefringence varies locally throughout the helix.

BRIEF SUMMARY OF THE INVENTION

An object of the present invention is to make it possible to easily manufacture a retardation layer that includes a plurality of regions which are different in in-plane retardation and thickness direction retardation.

According to a first aspect of the present invention, there is provided a retardation plate comprising a substrate; and a solidified liquid crystal layer which is a continuous film made of a same material supported by the substrate, and has biaxial optical anisotropy, the solidified liquid crystal layer comprising a plurality of regions, the plurality of regions being arranged on the substrate and being different in an in-plane retardation and a thickness direction retardation.

According to a second aspect of the present invention, there is provided a liquid crystal display comprising first and second substrates facing each other; a liquid crystal layer interposed between the first and second substrates; a solidified liquid crystal layer supported by a main surface of the first substrate facing the second substrate, having biaxial optical anisotropy, and comprising first to third regions, the first to third regions being arranged on the substrate, an in-plane retardation of the solidified liquid crystal layer being the smallest in the first region and the greatest in the third region, an Nz coefficient of the solidified liquid crystal layer being the greatest in the first region and the smallest in the third region, and the solidified liquid crystal layer being formed as a continuous film composed of a same material; and a color filter layer supported by the first or second substrate between the first and second substrates and comprising first to third coloring layers, the first to third coloring layers having different absorption spectra and facing the first to third regions, respectively.

Incidentally, the Nz constant a value obtained from $Nz=(n_x-n_z)/(n_x-n_y)$. $n_x$ is a maximum refractive index in a plane, $n_y$ is a minimum refractive index in the plane, and $n_z$ is a refractive index in a normal direction.

According to a third aspect of the present invention, there is provided a method for manufacturing a retardation plate retardation plate comprising forming a solidified liquid crystal layer on a substrate, the formation of the solidified liquid crystal layer comprising a step of forming a liquid crystal material layer on the substrate, the liquid crystal material layer comprising a photo-polymerizing or photo-crosslinking thermotropic liquid crystal compound, a chiral agent, and a dichroic photo-polymerization initiator, and mesogens of the thermotropic liquid crystal compound forming a cholesteric alignment structure; a step of irradiating at least two regions of the liquid crystal material layer with different exposure values of linearly polarized light and different exposure values of unpolarized parallel light, thereby polymerizing or crosslinking at least a portion of the thermotropic liquid crystal compound with different proportions and different degrees of anisotropy to generate a polymerized or crosslinked product; a subsequent step of heating the liquid crystal material layer to a temperature equal to or higher than a phase transition temperature at which the thermotropic liquid crystal compound changes from a liquid crystal phase to an isotropic phase, thereby changing an orientation state of the mesogens of the unreacted thermotropic liquid crystal compound in the at least two regions; and a step of polymerizing and/or crosslinking the unreacted compound with the orientation state of the mesogens maintained.

According to a fourth aspect of the present invention, there is provided a method for manufacturing a retardation plate comprising forming a solidified liquid crystal layer on a substrate, the formation of the solidified liquid crystal layer comprising a step of forming a liquid crystal material layer on the substrate, the liquid crystal material layer comprising a photo-polymerizing or photo-crosslinking thermotropic liquid crystal compound, a chiral agent, and a dichroic photo-polymerization initiator, and mesogens of the thermotropic liquid crystal compound forming a cholesteric alignment structure; a step of irradiating at least two regions of the liquid crystal material layer with elliptically polarized light having different ellipticities, thereby polymerizing or crosslinking at least a portion of the thermotropic liquid crystal compound with different proportions and different degrees of anisotropy to generate a polymerized or crosslinked product; a subsequent step of heating the liquid crystal material layer to a temperature equal to or higher than a phase transition temperature at which the thermotropic liquid crystal compound changes from a liquid crystal phase to an isotropic phase, thereby changing an orientation state of the mesogens of the unreacted thermotropic liquid crystal compound in the at least two regions; and a step of polymerizing and/or crosslinking the unreacted compound with the orientation state of the mesogens maintained.

According to a fifth aspect of the present invention, there is provided a retardation plate comprising a substrate; and a solidified liquid crystal layer which is a continuous film made of a same material supported by the substrate, and has biaxial optical anisotropy, the solidified liquid crystal layer comprising a plurality of regions, the plurality of regions being arranged on the substrate and being different in in-plane birefringence and thickness direction birefringence.

DETAILED DESCRIPTION OF THE INVENTION

Figure 1:
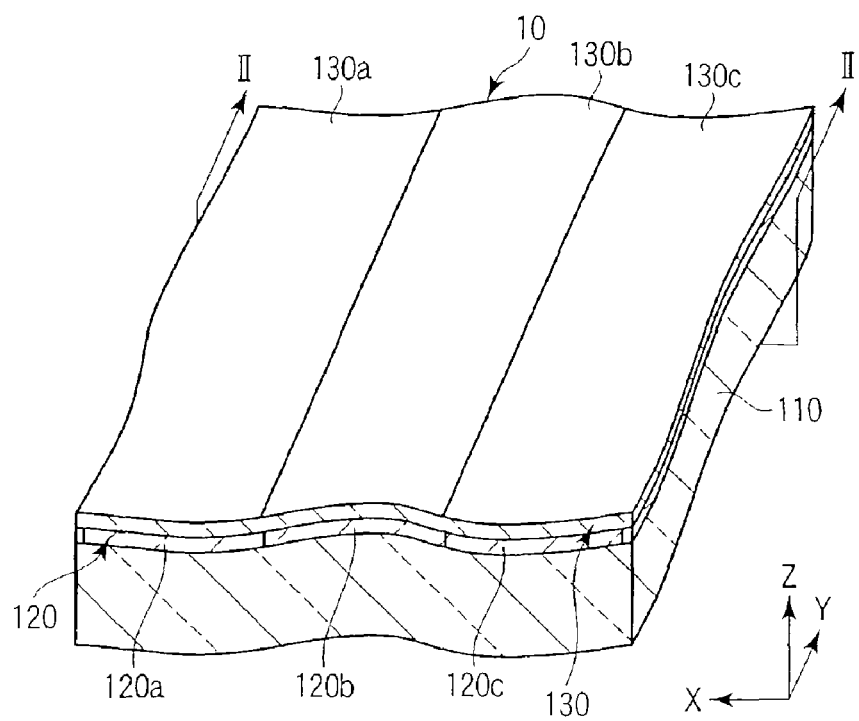
FIG. 1 is a perspective view schematically showing a retardation plate according to an embodiment of the present invention.

An embodiment of the present invention will be described below with reference to the accompanying drawings. Note that the same reference numerals in the drawings denote components that achieve the same or similar functions, and a repetitive explanation thereof will be omitted.

Figure 2:
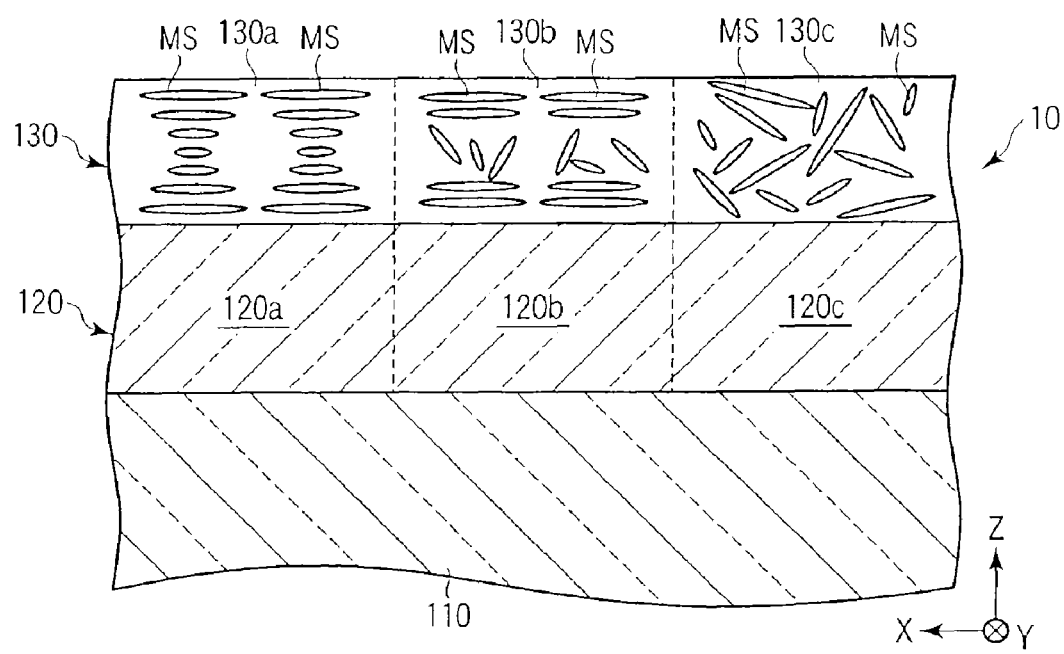
FIG. 2 is a sectional view taken along the line II-II of the retardation plate shown in FIG. 1.

FIG. 1 is a perspective view schematically showing a retardation plate according to an embodiment of the present invention. FIG. 2 is a sectional view taken along the line II-II of the retardation plate shown in FIG. 1.

The retardation plate 10 shown in FIGS. 1 and 2 includes a substrate 110, a color filter layer 120 and a solidified liquid crystal layer 130.

The substrate 110 has a light-transmitting property. The substrate 110 is, for example, a transparent substrate.

The color filter layer 120 is formed on the substrate 110. The color filter layer 120 includes coloring layers 120a to 120c different in absorption spectrum from one another and adjacent to one another on the substrate 110. For example, the light transmitted by the coloring layer 120a is shorter in wavelength than the light transmitted by the coloring layer 120b, and the light transmitted by the coloring layer 120b is shorter in wavelength than the light transmitted by the coloring layer 120c.

The color filter layer 120 may further include one or more coloring layer different in absorption spectrum from the coloring layer 120a to 120c. Here, as an example, it is supposed that the first coloring layer 120a is a blue coloring layer, the second coloring layer 120b is a green coloring layer, and the third coloring layer 120c is a red coloring layer.

Each of the coloring layers 120a to 120c has a band-like shape extending in the Y direction. The coloring layers 120a to 120c are alternately arranged in the X direction crossing the Y direction to form a stripe arrangement. Note that the X direction and the Y direction are directions parallel with the surface of the substrate 110 that face the color filter layer 120. Note also that the Z direction to be referred later is a direction perpendicular to the X direction and the Y direction.

The coloring layers 120a to 120c may have other shapes. For example, each of the coloring layers 120a to 120c has a rectangular shape. In this case, the coloring layers 120a to 120c may form a square arrangement of a delta arrangement.

Each of the coloring layers 120a to 120c is made of, for example, a mixture containing a transparent resin and a pigment dispersed therein. Forming a patterned layer of a coloring composition that contains a pigment and a pigment carrier and curing the patterned layer can obtain each of the coloring layers 120a to 120c. The coloring composition will be described later.

The solidified liquid crystal layer 130 is a retardation layer, and is formed on the color filter layer 120. The solidified liquid crystal layer 130 is a continuous film, and entirely covers one main surface of the color filter layer 120.

The solidified liquid crystal layer 130 and the color filter layer 120 may be in contact with each other or not. In the latter case, an alignment layer may be interposed between the solidified liquid crystal layer 130 and the color filter layer 120.

The solidified liquid crystal layer 130 includes three or more regions arranged in a direction parallel with the main surface thereof. At least two of the regions have form birefringence and cause different retardations.

Specifically, the solidified liquid crystal layer 130 includes regions 130a to 130c. The regions 130a to 130c are adjacent to one another in a direction perpendicular to the Z direction.

The regions 130a to 130c face the coloring layer 120a to 120c, respectively. The regions 130a to 130c have almost the same shape.

The regions 130a to 130c are formed by polymerization and/or crosslinking of a thermotropic liquid crystal compound or composition. The regions 130a to 130c are equal in composition.

Typically, the regions 130a to 130c are equal in thickness. That is, typically, the solidified liquid crystal layer 130 has a uniform thickness.

The regions 130a, 130b, and 130c are different in the in-plane retardation and the thickness direction retardation. The thickness direction retardation $R_{th}$ [nm] is expressed by the following formula, wherein $n_x$ is the maximum refractive index in the plane, $n_y$ is the minimum refractive index in the plane, $n_z$ is the refractive index in the normal direction, and d (μm) is the film thickness:

$$R_{th}=[(n_x-n_y)/2-n_z]\times d\times 1000$$

The differences in the in-plane retardation and the thickness direction retardation are caused by, for example, the fact that the thermotropic liquid crystal compound is polymerized or crosslinked with the degree of orientation differed between the regions. For example, a region containing a highly oriented thermotropic liquid crystal has a large in-plane retardation and a large thickness direction retardation. On the other hand, a region with a low degree of orientation has a small in-plane retardation and a small thickness direction retardation. The in-plane retardation and the thickness direction retardation are specified according to the optical design of the liquid crystal display including the retardation plate of the present invention. In typical cases, the differences in the retardations of the regions are 5 nm or more. If the difference in the retardations is less than 5 nm, the improvement of the display performance owing to the differences in the retardations may not be thoroughly achieved.

Further, the differences in the in-plane retardation and the thickness direction retardation are caused by the fact that the thermotropic liquid crystal compound is polymerized or crosslinked with the degrees of orientation differed among the in-plane angles, or the degrees of orientation have anisotropy. In this case, the Nz coefficient of one region is different from that of another region.

Here, the "degree of orientation" refers to the orientation state of the mesogens MS in each of the regions adjacent in the in-plane direction. The orientation state of the mesogens MS may be uniform in the entire region or varied along the Z direction. For example, in one region, the orientation may be uniform near the upper surface, and disturbed near the lower surface. In this case, the "degree of orientation" refers to an average of the degree of orientation in the direction of thickness.

More specifically, the region 130a has the highest in-plane birefringence, while the smallest Nz coefficient. The region 130c has the smallest in-plane birefringence, while the highest Nz coefficient. The region 130b has the second highest in-plane birefringence and Nz coefficient.

At least one of the regions may be an optically uniaxial negative C-plate wherein the in-plane retardation is substantially zero. In this case, the Nz coefficient is 100 or more. Alternatively, at least one of the regions may be an optically uniaxial positive A-plate wherein $n_y$ and $n_z$ are equal. In this case, the Nz coefficient is 1. Alternatively, the solidified liquid crystal layer 130 may have an optically isotropic region.

In at least one of the regions, the axial direction giving the highest refractive index in the plane may be different from those in the other regions. For example, in the region 130a, the axis giving the highest refractive index in the plane is set in the X direction, while in the region 130b, the axis giving the highest refractive index in the plane is set in the Y direction.

As described above, the regions 130a to 130c are different in the degree and/or state of orientation. In other words, the difference in the retardation of the regions in the retardation plate 10 of the present invention is mainly attributed to the difference in the birefringence. Therefore, it is not necessary to vary the thickness of the regions 130a to 130c with the intention of varying the retardation of the regions 130a to 130c. Depending on circumstances, the thicknesses of the regions 130a to 130c may be different from each other, but the formation of the solidified liquid crystal layer 130 is easier when the thicknesses of the regions 130a to 130c are equal.

As described above, the thicknesses of the regions 130a to 130c may be equal, thereby forming the solidified liquid crystal layer 130 as a continuous film. As a result, the solidified liquid crystal layer 130 is formed by a simplified process.

Further, the solidified liquid crystal layer 130 as a continuous film makes the mass transfer from the color filter layer 120 to the outside of the retardation plate 10 more difficult than the other patterned solidified liquid crystal layer 130 as a discontinuous film. Therefore, in the case where the retardation plate 10 that includes the solidified liquid crystal layer 130 as a continuous layer is used, for example, in a liquid crystal layer, it is possible to suppress the inclusion of impurities from the color filter layer 120 into the liquid crystal layer.

As described above, the in-plane retardation and the thickness direction retardation of the solidified liquid crystal layer 130 are varied among the regions by varying the degree and state of orientation of the mesogen MS using, for example, the following method: the orientation of a liquid crystal including a rod-like shape mesogen is disordered so as to give a cholesteric orientation (anisotropically disordered cholesteric orientation) wherein the length direction of the mesogen is perpendicular to the Z direction, and the orientation in one direction is more disordered than in the other direction. In this case, each of the regions 130a to 130c is a complex of a positive A-plate and a negative C-plate which develop differences in the in-plane retardation and the thickness direction retardation corresponding to the degree of orientation of the mesogen and its anisotropy (anisotropy of orientation disorder).

Next, materials and manufacturing methods of the retardation plate 10 will be described.

The substrate 110 is, typically, a light-transmitting substrate such as glass plate or resin plate. As a material of the glass plate, soda-lime glass, low-alkali borosilicate glass or non-alkali alumino borosilicate glass can be used, for example. As a material of the resin plate, polycarbonate, polymethyl methacrylate or polyethylene terephthalate may be used, for example.

The substrate 110 may have a monolayer structure or a multi-layered structure. For example, in the case where the retardation plate 10 is a component of a liquid crystal display, a light-transmitting substrate on which a transparent electrode made of transparent conductor such as indium tin oxide or tin oxide may be used as the substrate 10. Alternatively, as the substrate 110, a light-transmitting substrate on which a circuit such as pixel circuit is formed may be used.

The substrate 110 may be a light-transmitting film such as plastic film or a light-transmitting sheet such as plastic sheet.

It is unnecessary that the substrate 110 has a light-transmitting property. For example, when the retardation plate 10 employs the structure in which reflected light is utilized instead of transmitted light, the substrate 110 may have light-shielding property.

For forming the color filter layer 120, any method may be employed. According to an example, each of the coloring layers 120a to 120c can be obtained by forming a film of a coloring composition that contains a pigment carrier and a pigment dispersed therein and curing the film.

As the pigment of the coloring composition, organic pigment and/or inorganic pigment can be used. The coloring composition may contain a single organic or inorganic pigment, or a plurality of organic pigments and/or inorganic pigments.

A pigment excellent in coloring property and heat-resisting property, in particular, thermal decomposition-resisting property is preferable, and normally, organic pigments are utilized. The following color index numbers are examples of the organic pigments that can be used in the coloring composition.

As an organic pigment of a red coloring composition, a red pigment such as C. I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272 or 279 can be used, for example. As an organic pigment of a red coloring composition, a mixture of a red pigment and a yellow pigment may be used. As the yellow pigment, C. I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 198, 213 or 214 can be used, for example.

As an organic pigment of a green coloring composition, a green pigment such as C. I. Pigment Green 7, 10, 36 or 37 can be used, for example. As an organic pigment of a green coloring composition, a mixture of a green pigment and a yellow pigment may be used. As the yellow pigment, the same pigments as that described for the red coloring composition can be used, for example.

As an organic pigment of a blue coloring composition, a blue pigment such as C. I. Pigment Blue 15, 15:1, 15:2, 15:3, 15:4, 15:6, 16, 22, 60 or 64 can be used, for example. As an organic pigment of a blue coloring composition, a mixture of a blue pigment and a purple pigment may be used. As the purple pigment, C. I. Pigment Violet 1, 19, 23, 27, 29, 30, 32, 37, 40, 42 or 50 can be used, for example.

As the inorganic pigment, metal oxide powders, metal sulfide powders, or metal powders such as yellow lead ore, zinc yellow, iron red (red oxide of iron (III)), cadmium red, ultramarine blue, chromic oxide green and cobalt green can be used, for example. The inorganic pigment can be used, for example, in combination with the organic pigment in order to achieve excellent application property, sensitivity and developing property while balancing chroma and lightness.

The coloring composition may further contain coloring components other than the pigment. For example, the coloring composition may contain dye if a sufficient thermal resistance can be achieved. In this case, the dye can be used for color matching.

The transparent resin is a resin having a transmittance of preferably 80% or higher, more preferably 95% or higher throughout the entire wavelength range of 400 to 700 nm, which is the visible range. As the material of the transparent resin, i.e., the pigment carrier, transparent resins such as thermoplastic resin, thermosetting resin and photosensitive resin, the precursors thereof, or the mixture thereof can be used, for example. The transparent resin as the pigment carrier is, for example, a thermoplastic resin, a thermosetting resin a photosensitive resin or a mixture containing two or more of them. The precursor of the transparent resin is, for example, monomers and/or oligomers that cure when irradiated with rays.

In the coloring composition, the transparent resin is use at an amount of, for example, 30 to 700 parts by mass, preferably 60 to 450 parts by mass with respect to 100 parts by mass of the pigment. In the case where a mixture of the transparent resin and the precursor thereof is used as the pigment carrier, the transparent resin is used in the coloring composition at an amount of, for example, 20 to 400 parts by mass, preferably 50 to 250 parts by mass with respect to 100 parts by mass of the pigment. In this case, the precursor of the transparent resin is used in the coloring composition at an amount of, for example, 10 to 300 parts by mass, preferably 10 to 200 parts by mass with respect to 100 parts by mass of the pigment.

As the thermoplastic resin, butyral resins, styrene-maleic acid copolymers, chlorinated polyethylenes, polyvinyl chlorides, vinyl chloride-vinyl acetate copolymers, polyvinyl acetates, polyurethane resins, polyester resins, acrylic resins, alkyd resins, polystyrene resins, polyamide resins, rubber-based resins, cyclized rubber resins, celluloses, polybutadiens, polyethylenes, polypropylenes or polyimide resins can be used, for example.

As the thermosetting resin, epoxy resins, benzoguanamine resins, rosin-modified maleic resins, rosin-modified fumaric resins, melamine resins, urea resins or phenol resins can be used, for example.

As the photosensitive resin, resins obtained by causing the reaction of an acrylic compound, a methacrylic compound or cinnamic acid having a reactive substituent such as isocyanate group, aldehyde group and epoxy group with a linear polymer having a reactive substituent such as hydroxyl group, carboxyl group and amino group to introduce photo-crosslinking groups such as acryloyl groups, methacryloyl groups and styly groups into the linear polymer can be used, for example. Alternatively, resins obtained by half-esterifying a linear polymer including acid anhydride such as styrene-maleic anhydride copolymer and α-olefin-maleic anhydride copolymer using acrylic compounds or methacrylic compounds having hydroxyl group such as hydroxyalkyl acrylates and hydroxyalkyl methacrylates may be used.

As the monomers and/or oligomers, which are the precursor of the transparent resin, acrylic esters and methacrylic esters such as 2-hydroxyethyl acrylate, 2-hydroxyetyl methacrylate, 2-hydroxypropyl acrylate, 2-hydroxypropyl methacrylate, cycrohexyl acrylate, cycrohexyl methacrylate, polyethylene glycol diacrylate, polyethylene glycol dimethacrylate, pentaerythritol triacrylate, pentaerythritol trimethacrylate, trimethylolpropane triacrylate, trimethylolpropane trimethacrylate, dipentaerythritol hexaacrylate, dipentaerythritol hexamethacrylate, tricyclodecanyl acrylate, tricyclodecanyl methacrylate, melamine acrylate, melamine methacrylate, epoxy acrylate and epoxy methacrylate; acrylic acid, methacrylic acid, styrene, vinyl acetate, acrylamide, methacrylamide, N-hydroxymethyl acrylamide, N-hydroxymethyl methacrylamide or a mixture containing two or more of them can be used, for example.

In the case where the coloring composition is cured using light such as ultraviolet rays, for example, a photo-polymerization initiator is added to the coloring composition.

As the photo-polymerization initiator, acetophenone-based photo-polymerization initiator such as 4-phenoxy-dichloroacetophenone, 4-t-butyl-dichloroacetophenone, diethoxyacetophenone, 1-(4-isopropylphenyl)-2-hydroxy-2-methylpropane-1-one, 1-hydroxycyclohexylphenylketone, 2-methyl-1[4-(methylthio)phenyl]-2-morpholinopropane-1-one and 2-benzyl-2-dimethylamino-1-(4-morpholinophenyl)-butane-1-one; benzoin-based photo-polymerization initiator such benzoin, benzoylbenzoate, methylbenzoylbenzoate, 4-phenylbenzophenone, hydroxybenzophenone, acrylated benzophenone and 4-benzoyl-4'-methyldiphenyl sulfide; thioxanthone-based photo-polymerization initiator such as thioxanthone, 2-chlorothioxanthone, 2-methyltioxanthone, isopropylthioxanthone and 2,4-diisopropylthioxanthone; triazine-based photo-polymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triaine, 2-(naphto-1-yl)-4,6-bis(trichloromethyl)-s-triazine, 2-(4-methoxy-naphto-1-yl)-4,6-bis(trichloromethyl)-s-triazine, 2,4-trichloromethyl-(piperonyl)-6-triazine and 2,4-trichloromethyl(4'-methoxystyryl)-6-triazine; borate-based photo-polymerization initiator; carbazole-based photo-polymerization initiator; imidazole-based photo-polymerization initiator; or a mixture containing two or more of them can be used, for example.

The photo-polymerization initiator is used in the coloring composition at an amount of, for example, 5 to 200 parts by mass, preferably 10 to 150 parts by mass with respect to 100 parts by mass of the pigment.

A sensitizer may be used together with the photo-polymerization initiator.

As the sensitizer, a compound such as α-acyloxy ester, acylphosphine oxide, methylphenyl glyoxylate, benzil, 9,10-phenanthrenequinone, camphor quinone, ethyl anthraquinone, 4,4'-diethyl isophthaloquinone, 3,3',4,4'-tetra (t-butylperoxycarbonyl)benzophenone and 4,4'-diehylamino benzophenone can be used.

The sensitizer is used at an amount of, for example, 0.1 to 60 parts by mass with respect to 100 parts by mass of the photo-polymerization initiator.

The coloring composition may further contain a chain transfer agent such as multi-functional thiol.

A multi-functional thiol is a compound having two or more thiol groups. As the multi-functional thiol, hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionic tris(2-hydroxyethyl)isocyanurate, 1,4-dimethylmercaptobenzene, 2,4,6-trimercapto-s-triazine, 2-(N,N-dibutylamino)-4,6-dimercapto-s-triazine or a mixture containing two or more of them can be used, for example.

The multi-functional thiol is used in the coloring composition at an amount of, for example, 0.2 to 150 parts by mass, preferably 0.2 to 100 parts by mass with respect to 100 parts by mass of the pigment.

The coloring composition may further contain a solvent. When the solvent is used, the dispersibility of the pigment increases. As a result, the coloring composition can be easily applied to the substrate 110 at a dried thickness of, for example, 0.2 to 5 μm.

As the solvent, cyclohexanone, ethyl cellosolve acetate, butyl cellosolve acetate, 1-methoxy-2-propyl acetate, diethylene glycol dimethoxy ether, ethyl benzene, ethylene glycol diethyl ether, xylene, ethyl cellosolve, methyl-n amyl ketone, propylene glycol monomethyl ether, toluene, methyl ethyl ketone, ethyl acetate, methanol, ethanol, isopropyl alcohol, butanol, isobutyl ketone, petroleum solvent, or a mixture containing two or more of them can be used, for example.

The solvent is used in the coloring composition at an amount of, for example, 800 to 4,000 parts by mass, preferably 1,000 to 2,500 parts by mass with respect to 100 parts by mass of the pigment.

The coloring composition can be manufactured, for example, by finely dispersing one or more pigment into the pigment carrier and the organic solvent together with the above-described photo-polymerization initiator as needed using a dispersing device such as three-roll mill, two-roll mill, sand mill, kneader and attritor. A coloring composition containing two or more pigments may be manufactured by preparing dispersions containing different pigments and mixing the dispersions together.

When dispersing the pigment into the pigment carrier and the solvent, a dispersion aid such as resin-type pigment-dispersing agent, surfactant and pigment derivative may be used. The dispersion aid increases the dispersibility of the pigment and suppresses the reaggregation of the dispersed pigment. Therefore, in the case of using a coloring composition prepared by dispersing a pigment into a pigment carrier and a solvent using a dispersion aid, a color filter excellent in transparency can be obtained.

The dispersion aid is used in the coloring composition at an amount of, for example, 0.1 to 40 parts by mass, preferably 0.1 to 30 parts by mass with respect to 100 parts by mass of the pigment.

The resin-type pigment-dispersing agent includes a pigment-affinitive moiety having a property of undergoing adsorption by the pigment and a moiety having a compatibility with the pigment carrier. The resin-type pigment-dispersing agent is adsorbed by the pigment so as to stabilize the dispersibility of the pigment in the pigment carrier.

As the resin-type pigment-dispersing agent, an oil-based dispersing agent such as polyurethane, polycarboxylate, e.g. polyacrylate, unsaturated polyamide, polycarboxylic acid, partial amine salt of polycarboxylic acid, ammonium polycarboxylate, alkylamine polycarboxylate, polysiloxane, long-chain polyaminoamide phosphate and hydroxyl group-containing polycarboxylate, modified compounds thereof, amide produced through a reaction of poly(lower alkylene imine) with polyester having a free carboxyl group and a salt thereof; water-soluble resin or water-soluble macromolecular compound such as acrylic acid-styrene copolymer, methacrylic acid-styrene copolymer, acrylic acid-acrylate copolymer, acrylic acid-methacrylate copolymer, methacrylic acid-acrylate copolymer, methacrylic acid-methacrylate copolymer, styrene-maleic acid copolymer, polyvinyl alcohol and polyvinyl pyrrolidone; polyester; modified polyacrylate; ethylene oxide/propylene oxide adduct; phosphate; or a compound containing two or more of them can be used, for example.

As the surfactant, an anionic surfactant such as polyoxyethylene alkylether sulfate, dodecylbenzene sodium sulfonate, alkali salt of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer and polyoxyethylene alkylether phosphate; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate and polyethyleneglycol monolaurate; a cationic surfactant such as alkyl quaternary ammonium salt and an ethylene oxide adduct thereof; an amphoteric surfactant such as alkyl betaine, e.g. betaine alkyldimethyl aminoacetate and alkylimidazoline; and a mixture containing two or more of them can be used, for example.

The dye derivative is a compound produced by introducing a substituent into an organic dye. Although the dye derivative is similar in hue to the pigment used, the hue of the former may be different from that of the latter if the loading thereof is small. Note that the term "organic dye" includes aromatic polycyclic compounds exhibiting a light yellow color such as naphthalene-based compounds and anthraquinone-based compounds, which are generally not referred to as "dye", in addition to compounds generally referred to as "dye". As the dye derivative, those described in JP-A 63-305173, JP-B 57-15620, JP-B 59-40172, JP-B 63-17102 or JP-B 5-9469 can be used, for example. Especially, the dye derivatives having a basic group are highly effective in the dispersion of pigment. The coloring composition may contain a single dye derivative or a plurality of dye derivatives.

A storage-stability improver may be added to the coloring composition in order to improve the temporal stability of its viscosity. As the storage-stability improver, benzyltrimethyl chloride; quaternary ammonium chloride such as diethylhydroxy amine; organic acid such as lactic acid and oxalic acid; methyl ether of the organic acid; t-butyl pyrocatechol; organic phosphine such as tetraethyl phosphine and tetraphenyl phosphine; phosphite; or a mixture containing two or more of them can be used, for example.

The storage-stability improver is contained in the coloring composition at an amount of, for example, 0.1 to 10 parts by mass with respect to 100 parts by mass of the pigment.

To the coloring composition, an adhesion improver such as silane coupling agent may be added in order to improve the adhesion to the substrate.

As the silane coupling agent, vinyl silane such as vinyl tris(β-methoxyethoxy)silane, vinylethoxy silane and vinyltrimethoxy silane; acrylsilane and metacrylsilane such as γ-methacryloxypropyl trimethoxy silane; epoxy silane such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane and γ-glycidoxypropyl triethoxy silane; amino silane such as N-β (aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane and N-phenyl-γ-aminopropyl triethoxy silane; thiosilane such as γ-mercaptopropyl trimethoxy silane and γ-mercaptopropyl triethoxy silane; or a mixture containing two or more of them can be used, for example.

The silane coupling agent is contained in the coloring composition at an amount of, for example, 0.01 to 100 parts by mass with respect to 100 parts by mass of the pigment.

The coloring composition can be prepared in the form of a gravure offset printing ink, a waterless offset printing ink, a silk screen printing ink, or a solvent developer-type or alkaline developer-type colored resist. The colored resist is the one that is obtained by dispersing dye in a composition containing a thermoplastic resin, thermosetting resin or photosensitive resin, a monomer, a photo-polymerization initiator and an organic solvent.

The pigment is used at an amount of, for example, 5 to 70 parts by mass, preferably 20 to 50 parts by mass with respect to 100 parts by mass of the total solid contents in the coloring composition. Note that most of the remainder of the solid contents in the coloring layer is the resin binder included in the pigment carrier.

Prior to using the coloring composition for forming a film, particles having a size of 5 µm or more, preferably 1 µm or more, more preferably 0.5 µm or more may be removed from the coloring composition using a refiner such as centrifugal separator, sintered filter and membrane filter.

Each of the coloring layers 120a to 120c can by formed, for example, by printing. According to printing, printing using the coloring composition and drying it thereafter can form each of the coloring layers 120a to 120c. Therefore, the printing method is low cost and excellent in mass productivity. Further, since the printing technique is improved in recent years, printing can form fine patterns having high dimension accuracy and high smoothness.

In the case where printing is used, the coloring composition should be designed to have a composition that would not cause the coloring composition to be dried and solidified on the printing plate or the blanket. Also, in the printing, it is important to optimize the flowability of the coloring composition in the printer. Therefore, a dispersing agent or an extender may be added to the coloring composition so as to adjust the viscosity thereof.

Each of the coloring layers 120a to 120c may be formed using photolithography. According to photolithography, the color filter layer 120 can be formed with higher accuracy as compared with the case where printing is utilized.

In this case, the coloring composition prepared as a solvent developer-type or alkaline developer-type colored resist is applied first to the substrate 110. For this application, an application method such as spray coating, spin coating, slit coating and roll coating is utilized. The coated film is formed to have a dried thickness of, for example, 0.2 to 10 µm.

Next, the coated film is dried. For example a vacuum drier, a convection oven, an IR oven or a hot plate is used for drying the coated film. Drying the coated film can be omitted.

Subsequently, the coated film is irradiated with ultraviolet rays via a photomask. That is, the coated film is subjected to a pattern exposure.

Then, the coated film is immersed in a solvent developer or an alkaline developer. Alternatively, the coated film is sprayed with the developer. Thus, soluble portions are removed from the coated film to obtain the coloring layer 120a as a resist pattern.

Further, by the same method as described above, the coloring layers 120b and 120c are formed in this order. Thus, the color filter layer 120 is obtained. Note that in this method, a heat treatment may be executed in order to promote the polymerization of the colored resists.

In the photolithography process, for example, an aqueous solution of sodium carbonate or sodium hydroxide can be used as the alkaline developer. Alternatively, a liquid containing an organic alkali such as dimethylbenzyl amine and triethanol amine may be used as the alkaline developer.

An additive such as defoaming agent or surfactant may be added to the developer. A shower developing method, a spray developing method, a dip developing method or a paddle developing method may be utilized for developing, for example.

In order to enhance the sensitivity to light exposure, the following process may be further executed. That is, after drying the first coated film of the colored resist, an alkaline-soluble resin, for example, polyvinyl alcohol or water-soluble acrylic resin is applied to the first coated film. After drying the second coated film, the above-described pattern exposure is performed. The second coated film prevents the polymerization in the first coated film from being inhibited by oxygen. Therefore, a higher sensitivity to light exposure can be achieved.

The color filter layer 120 may be formed by other methods. For example, it may be formed using an inkjet method, an electrodeposition method or a transfer method. In the case where the color filter layer 120 is formed using the inkjet method, each coloring layer is obtained, for example, by forming a light-shielding partition wall on the substrate 110 in advance and injecting an ink from a nozzle toward regions separated by the light-shielding partition wall. In the case where the color filter layer 120 is formed using the electrodeposition method, each coloring layer is obtained, for example, by forming a transparent conductive layer on the substrate 110 in advance and depositing the coloring composition on the transparent conductive film utilizing an electrophoresis of colloidal particles made of the coloring composition. In the case where the transfer method is used, the color filter layer 120 is formed on a surface of a releasable transfer base sheet in advance, and then the color filter layer 120 is transferred from the base sheet onto the substrate 110.

Next, a method for manufacturing the solidified liquid crystal layer 130 will be described.

Figure 3:
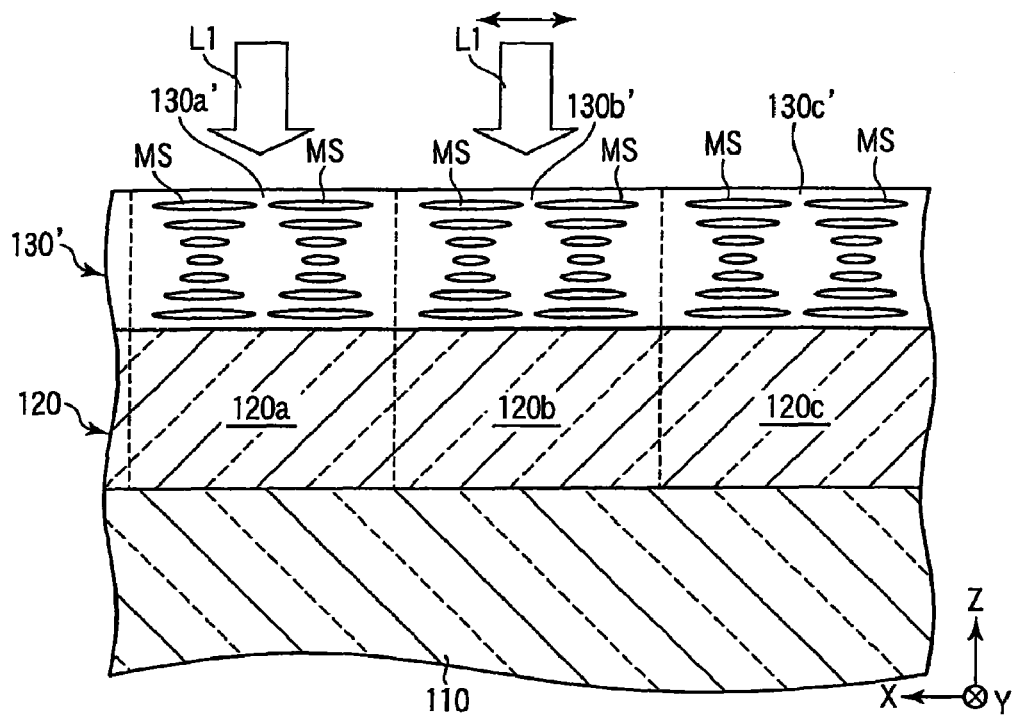
FIG. 3 is a sectional view schematically showing one example of a method of forming a solidified liquid crystal layer.
Figure 4:
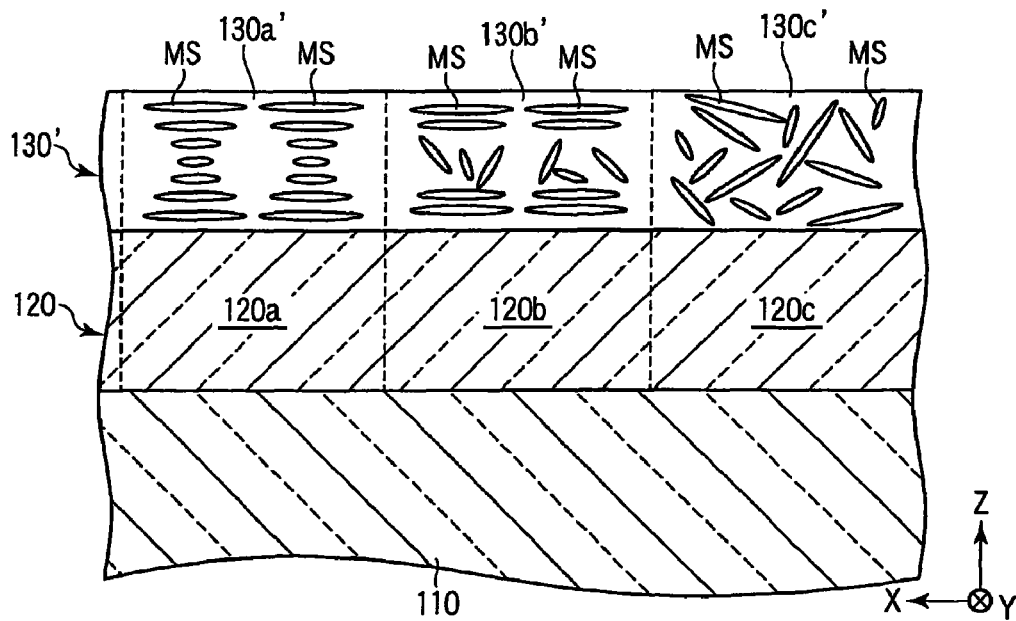
FIG. 4 is a sectional view schematically showing one example of a method of forming a solidified liquid crystal layer.

FIGS. 3 and 4 are sectional views schematically showing an example of a method of forming a solidified liquid crystal layer.

The solidified liquid crystal layer 130 is obtained, for example, by forming a liquid crystal material layer 130' containing a photo-polymerizing or photo-crosslinking thermotropic liquid crystal material on the color filter layer 120 and subjecting the liquid crystal material layer 130' to a pattern exposure and a heat treatment.

The liquid crystal material layer 130' can be obtained, for example, by applying a coating solution, containing a thermotropic liquid crystal compound, a chiral agent, and a photo-polymerization initiator, on the color filter layer 120 and drying the coated film, if necessary. In the liquid crystal material layer 130', the mesogens of the thermotropic liquid crystal compound form a cholesteric alignment structure.

In addition to the above-described components, other components such as solvent, thermal polymerization initiator, sensitizer, chain transfer agent, multi-functional monomer and/or oligomer, resin, surfactant, storage-stability improver and adhesion improver can be added to the coating solution to the extent that the composition containing the liquid crystal compound does not lose mesomorphism.

As the thermotropic liquid crystal compound, alkyl cyanobiphenyl, alkoxy biphenyl, alkyl terphenyl, phenyl cyclohexane, biphenyl cyclohexane, phenyl bicyclohexane, pyrimidine, cyclohexane carboxylic acid ester, halogenated cyanophenol ester, alkyl benzoic acid ester, alkyl cyanotolane, dialkoxy tolane, alkyl alkoxy tolane, alkyl cyclohexyl tolane, alkyl bicyclohexane, cyclohexyl phenyl ethylene, alkyl cyclohexyl cyclohexene, alkyl benzaldehyde azine, alkenyl benzaldehyde azine, phenyl naphthalene, phenyl tetrahydronaphtalene, phenyl decahydronaphthalene, derivatives thereof, or acrylates of the compounds can be used, for example.

The chiral agent is a low molecular weight compound having an optically active moiety, and typical examples thereof have a molecular weight of 1500 or less. The chiral agent is used for the purpose of inducing a helical structure in the positive uniaxial nematic regularity developed by a polymerizable liquid crystal material exhibiting nematic regularity. As long as the object is achieved, the type of the chiral agent is not particularly limited. The chiral agent may be any compound which mixes with the polymerizable liquid crystal material showing nematic regularity in a state of solution or melt, and induces a desired helical structure in the polymerizable liquid crystal material without impairing the liquid crystallinity of the material.

The chiral agent must have some chirality in its molecule, because it is used for inducing a helical structure in the liquid crystal. Accordingly, the chiral agent used herein is preferably, for example, a compound having one or more asymmetric carbons, a compound having an asymmetric point on the hetero atom such as a chiral amine or sulfoxide, or a compound having an optically active moiety with axial asymmetry, such as cumulene or binaphthol. Specific examples include commercially available chiral nematic liquid crystals such as Paliocolor LC 756 (manufactured by BASF), or a chiral dopant liquid crystal S-811 (manufactured by Merck Ltd.).

Since the solidified liquid crystal layer 130 of the present invention is required to have high transparency in the visible region, the chiral agent is added in an amount such that the helical pitch of the liquid crystal material layer 130' is short and the wavelength of the selective reflection is about 400 nm or less. The specific content of the chiral agent may be 3 to 50% by weight with reference to the thermotropic liquid crystal compound, depending on the type of the thermotropic liquid crystal compound or the distortion inducing force of the chiral agent.

A dichroic photopolymerization initiator is used as the photopolymerization initiator, and examples thereof include biphenyl cyclohexane derivatives represented by the following chemical formula.

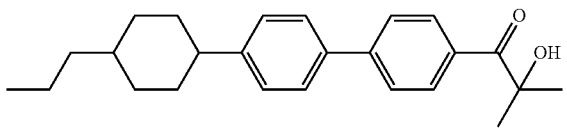

As the sensitizer, chain transfer agent, multi-functional monomer and/or oligomer, resin, surfactant, storage-stability improver and adhesion improver, the same materials as that exemplified for the coloring composition can be used, for example. Also, as the solvent, the same materials as that exemplified for the coloring composition can be used, for example.

The solidified liquid crystal layer 130 is formed from the coating solution containing the above-described thermotropic liquid crystal compound, chiral agent, photo-polymerization initiator and, as necessary, other additives. The chiral agent is effective when its amount is from 2 to 30 parts by weight with reference to the thermotropic liquid crystal compound, the amount depending on the helical inducing force. The amount of the dichroic photo-polymerization initiator is preferably 0.1 to 20 parts by weight with reference to the total amount of the thermotropic liquid crystal compound and the chiral agent. If the amount of the dichroic photo-polymerization initiator is less than 0.1 part by weight, sufficient photo-sensitivity will not be achieved, which results in the failure to obtain a sufficient amount of polymerized or crosslinked product in the exposure process. On the other hand, if the amount of the photo-polymerization initiator is more than 20 parts by weight, the photosensitivity becomes too high, which results in the failure to leave unreacted compounds in the exposure process.

For applying the coating solution, a printing method such as spin coating, slit coating, relief printing, screen printing, planographic printing, reverse printing and gravure printing; the printing method incorporated into an offset system; an inkjet method; or bar coat method can be used, for example.

The liquid crystal material layer 130' is formed, for example, as a continuous layer having a uniform thickness. According to the method described above, the liquid crystal material layer 130' can be formed as a continuous film having a uniform thickness as long as the surface to be coated is sufficiently flat.

Prior to the application of the coating solution, the surface of the color filter layer 120 may be subjected to an alignment process such as rubbing process. Alternatively, prior to the application of the coating solution, an alignment layer for regulating the orientation of the liquid crystal compound may be formed on the color filter layer 120. Forming a transparent layer of resin such as polyimide on the color filter layer 120 and subjecting the transparent resin layer to an alignment process such as rubbing process can obtain the alignment layer, for example. The alignment layer may be formed using a photo-alignment technique.

In the liquid crystal material layer 130', the dichroic photo-polymerization initiator is oriented to have a cholesteric structure, as well as the mesogen of the thermotropic liquid crystal compound. Therefore, irradiation of the liquid crystal material layer 130' with unpolarized light and polarized light achieves polymerization, i.e., crosslinking, with desired proportions and desired degrees of anisotropy. In other words, the thermotropic liquid crystal compound is heterogeneously polymerized or crosslinked.

The liquid crystal material layer 130' containing the thermotropic liquid crystal compound, chiral agent, and dichroic photo-polymerization initiator is subjected to a first exposure process. More specifically, as shown in FIG. 3, a plurality of regions of the liquid crystal material layer 130' are subjected to pattern exposure. Pattern exposure light L1 is composed of linearly polarized light and unpolarized parallel light, and the exposure value differs with regions. Either of the linearly polarized light or unpolarized parallel light may be used for the irradiation. The light L1 applied to some regions may be one light, and some regions may not be irradiated with any type of light.

For example, on the liquid crystal material layer 130', the region 130a' corresponding to the region 130a is irradiated with a sufficient exposure value of unpolarized parallel light alone as the light L1. On the liquid crystal material layer 130', the region 130b' corresponding to the region 130b is irradiated with a sufficient exposure value of linearly polarized light as the light L1. On the liquid crystal material layer 130', no light is applied to the region 130c' corresponding to the region 130c.

In the liquid crystal material layer 130', the cholesteric orientation state formed by the mesogen is immobilized according to the type and exposure value of the irradiated light L1, whereby the thermotropic liquid crystal compound is polymerized or crosslinked. In the polymerized or crosslinked product of the thermotropic liquid crystal compound, the mesogenic groups lose their flowability, whereby the orientation variation in the subsequent process is prevented.

For example, in the region 130a' irradiated with a sufficient exposure value of unpolarized parallel light alone as the light L1, the cholesteric orientation state of the mesogen is immobilized with the state generally maintained. The content of the polymerized or crosslinked product of the thermotropic liquid crystal compound wherein the mesogenic groups are in the cholesteric orientation state is the highest, and the content of the unpolymerized and uncrosslinked thermotropic liquid crystal compound is the smallest.

In the region 130b' irradiated with a sufficient exposure value of linearly polarized light alone as the light L1, the orientation state is immobilized with the state generally maintained in a specific in-plane direction according to the polarization axis. On the other hand, the orientation state in the other directions is not immobilized and still has flowability, though the state of the orientation is unchanged. In comparison with the region 130a', the polymerized and/or crosslinked product of the thermotropic liquid crystal compound having a immobilized orientation state is present, but the proportion is tilted toward those having mesogenic groups oriented in a specific direction. Therefore, as a whole, the content of the unpolymerized or uncrosslinked thermotropic liquid crystal compound is higher.

The light used in the first exposure process is electromagnetic waves such as ultraviolet rays, visible rays and infrared rays. An electron beam may be used instead of the electromagnetic waves. Only one of them may be used as the light L1. Alternatively, two or more of them may be used as the light L1.

The first exposure process may be performed by any method as long as the above-described nonuniform polymerization or crosslinking can be caused.

For example, the exposure process may include exposure operations using photomasks having different patterns of the light shielding layers. For example, the region 130a' is selectively irradiated with a maximum exposure value of unpolarized parallel light as the light L1 through a certain photomask, and the region 130b' is selectively irradiated with a maximum exposure value of linearly polarized light as the light L1 through a photomask different from the above one.

Alternatively, the exposure process may include exposure of the region 130a' through a certain photomask, and exposure of the region 130b' through the same photomask. In this case, for example, the region 130a' is irradiated with a maximum exposure value of unpolarized parallel light as the light L1 through a certain photomask. Using the photomask, the region 130b is irradiated with a maximum exposure value of linearly polarized light as the light L1.

Alternatively, in place of the exposure through a photomask, the liquid crystal material layer 130' may be scanned with radiation such as an electron beam or a luminous fluxs.

Alternatively, the above-described methods may be combined. Irrespective of which method is used for the first exposure process, the orientation state of the thermotropic liquid crystal compound in the liquid crystal material layer 130' will not cause a marked change in the first exposure process. In the first exposure process, the degree of polymerization or the degree of polymerization anisotropy of the thermotropic liquid crystal compound in the liquid crystal material layer 130' is formed into a so-called "latent image".

After completing the first exposure process, a first heating process is performed. That is, the liquid crystal material layer 130' is heated to a temperature equal to or higher than the phase transition temperature at which the thermotropic liquid crystal compound changes from a liquid crystal phase to an isotropic phase. As a result of the first heating process, the "latent image" formed in the above-described first exposure process develops as a change of the orientation state of the mesogen.

Details are as follows. The mesogen moiety of the thermotropic liquid crystal compound as an unreacted compound is not immobilized. Therefore, when the liquid crystal material layer 130' is heated to the phase transition temperature or higher, the orientation of the mesogen of the unreacted compound is lowered. For example, the mesogen of the unreacted compound changes from the liquid crystal phase to the isotropic phase. On the other hand, the mesogen of the polymerized or crosslinked product of the thermotropic liquid crystal compound are immobilized.

Accordingly, as shown in FIG. 4, in the region 130a' irradiated with a sufficient exposure value of unpolarized parallel light alone as the light L1, the orientation state of the mesogen MS is hardly changed by the heat treatment. The orientation state is immobilized with the cholesteric orientation maintained. As a result of this, a negative C-plate is obtained.

The orientation of the mesogen MS in the region 130b' irradiated with a sufficient exposure value of linearly polarized light as the light L1 is immobilized in a specific direction in the plane according to the deflection axis, while disordered in other directions. As a result of this, the region 130b' develops a biaxiality composed of a positive A-plate and a negative C-plate, and thus having both of the in-plane retardation and the thickness direction retardation. In the region 130c', to which no light is applied before heating, the orientation structure of the mesogen MS disappears upon heat treatment. As shown in the figure, in the region 130c', the cholesteric orientation of the mesogen MS is almost completely disordered to give an isotropic phase.

The orientation states of the mesogen MS in a plurality of regions of the liquid crystal material layer 130' may be freely controlled by changing the exposure values of the linearly polarized light and unpolarized parallel light, or the exposure value ratio between the linearly polarized light and unpolarized parallel light in the first exposure process, followed by the first heating process. An example is described with reference to FIGS. 5 and 6.

Figure 5:
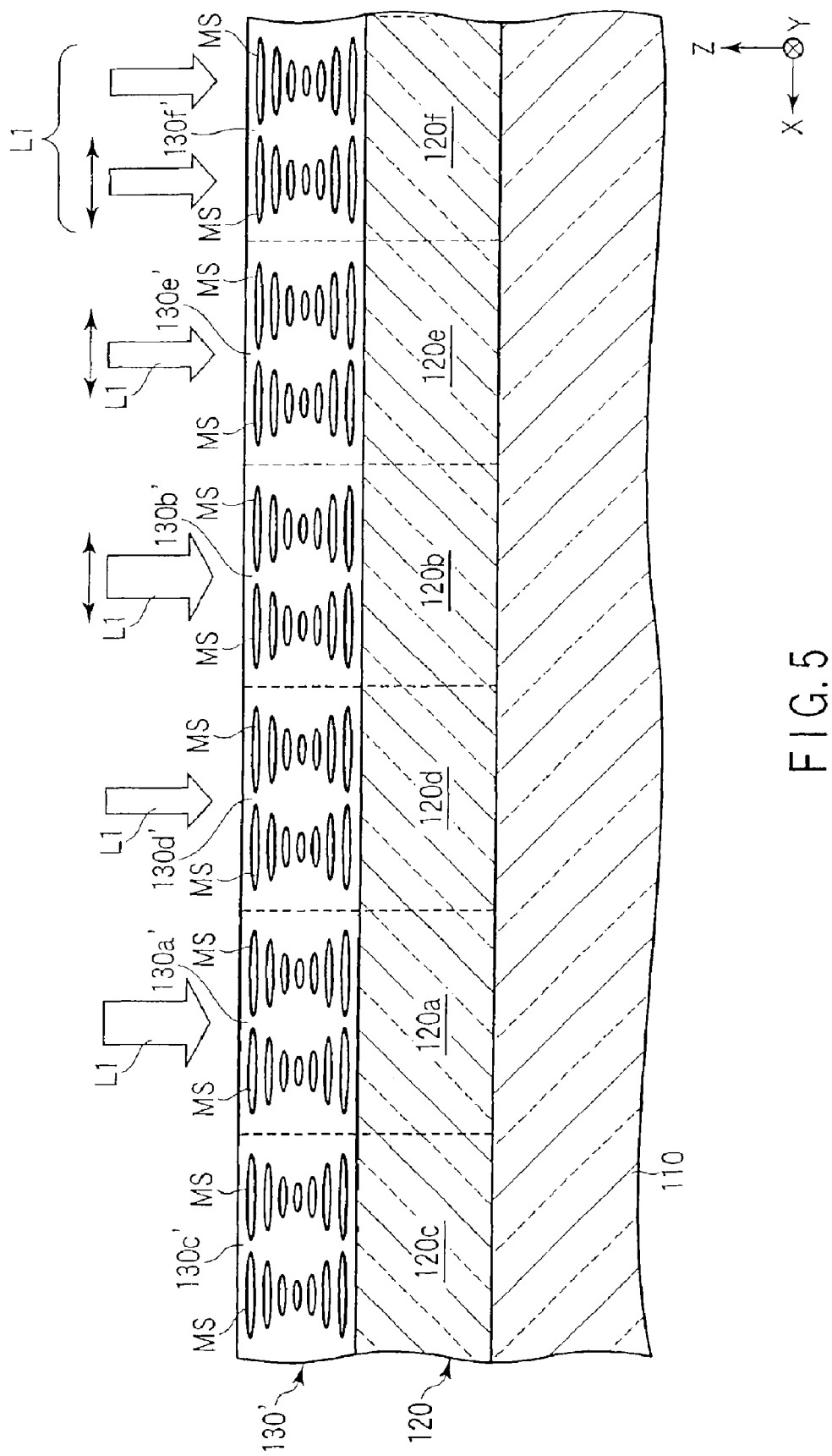
FIG. 5 is a sectional view schematically showing another example of a method of forming a solidified liquid crystal layer.

FIG. 5 shows the liquid crystal material layer 130' containing the regions 130a' to 130f'. As described above, the regions 130a' to 130c' are irradiated with different types of the light L1, and the regions 130d' to 130f' are also irradiated with different types of the light L1.

The region 130c' is not irradiated with the light L1, and the region 130a' is irradiated with a sufficient exposure value of unpolarized parallel light as the light L1. The region 130d' is irradiated with unpolarized parallel light as the light L1 with a smaller exposure value than the region 130a'.

The region 130b' is irradiated with a sufficient exposure value of linearly polarized light as the light L1, and the region 130e' is irradiated with linearly polarized light as the light L1 with a smaller exposure value than the region 130b'. Further, the region 130f' is irradiated with unpolarized parallel light and linearly polarized light as the light L1 with smaller exposure values than the regions 130a' and 130b', respectively.

The sufficient exposure value of the unpolarized parallel light refers to an exposure value by which the major portion of the thermotropic liquid crystal compound is substantially polymerized or crosslinked. Even if the light is applied with an exposure value over the sufficient exposure value, no difference is found in the orientation state in the subsequent first heat treatment process. The sufficient exposure value of the linearly polarized light refers to an exposure value by which the anisotropy of the polymerization or crosslinking of the thermotropic liquid crystal compound is maximized. In principle, when the quenching ratio of the linearly polarized light is infinite, even if the light is applied with an exposure value over the sufficient exposure value, no difference is found in the orientation state in the subsequent first heat treatment process.

In general cases, the quenching ratio of linearly polarized light is finite, and the in-plane retardation gradually decreases when the light is continuously applied with an exposure value over the sufficient exposure value. When the exposure value is in such a range, the thickness direction retardation cannot be controlled. The present invention requires the differences in the in-plane retardation and the thickness direction retardation, and thus does not use the exposure value in the above range.

A specific value cannot be given for the sufficient exposure value because it markedly varies depending on the type of the thermotropic liquid crystal compound, the type and amount of the (dichroic) photo-polymerization initiator, the presence or absence, type, and amount of other additives, and the type and intensity of the irradiated light. In typical cases, a sufficient exposure value is about 200 mJ/cm$^2$ to 1000 mJ/cm$^2$. For example, when a luminous flux of 20 mW/cm$^2$ is used, sufficient exposure is achieved with irradiation for about 10 to 50 seconds.

If the above-described sufficient exposure value is not reached, the exposure value is insufficient, but the degree of immobilization of the orientation by the light is not necessarily proportional to the exposure value. The immobilization often markedly proceeds with a small exposure value. For example, even if the exposure value is half the sufficient exposure value, over half of the orientation is immobilized. In order to achieve a significant difference from the region irradiated with a sufficient exposure value, the desirable exposure value may be markedly smaller than the sufficient exposure value. More specifically, an insufficient exposure value is about 2 mJ/cm$^2$ to 180 mJ/cm$^2$. For example, when a luminous flux of 20 mW/cm$^2$ is used, the exposure is insufficient when the irradiation time is about 0.1 to 9 seconds.

Figure 6:
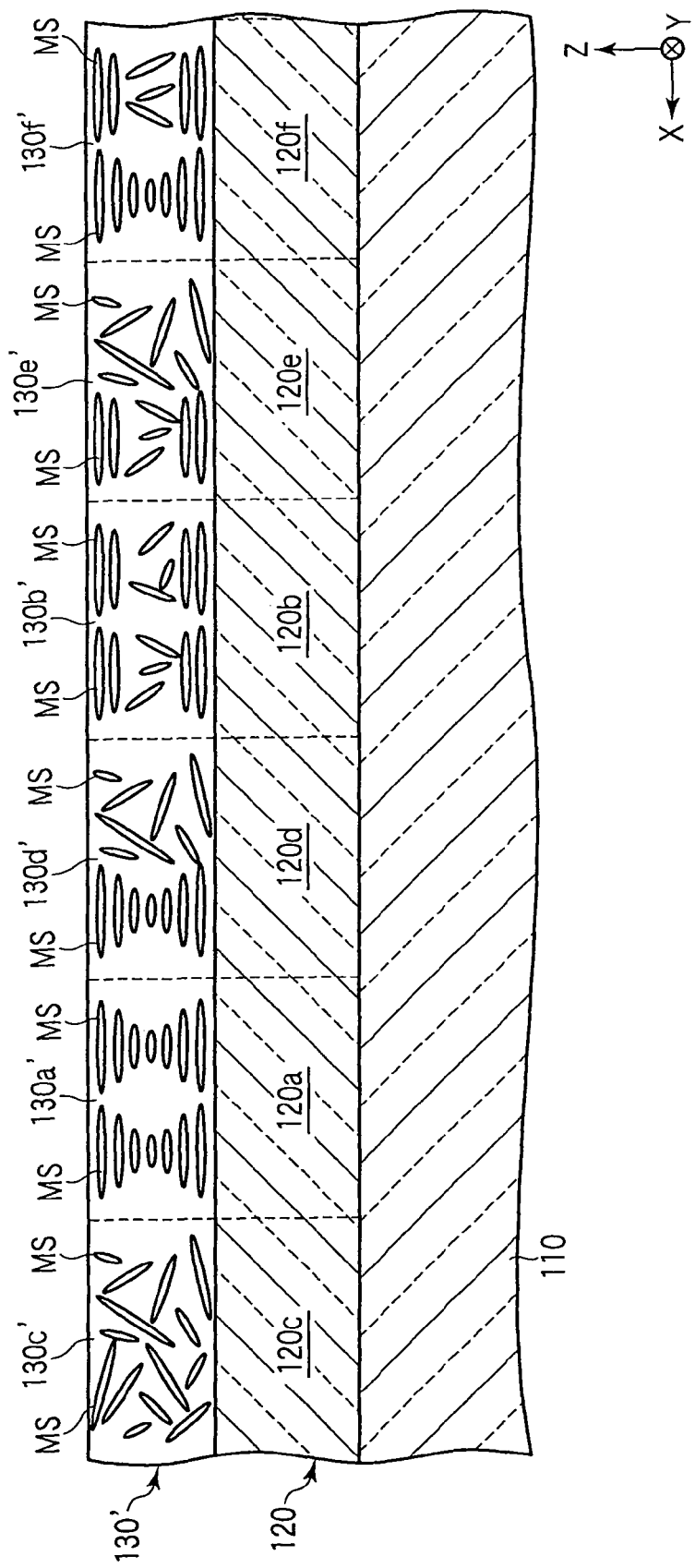
FIG. 6 is a sectional view schematically showing another example of a method of forming a solidified liquid crystal layer.

FIG. 6 shows the result of the above-described first heating process performed after the completion of the first exposure process through the irradiation of the light L1.

In the region 130$d'$ which has been irradiated with an insufficient exposure value of unpolarized parallel light as the light L1, the orientation of the uncured component, which remains due to the insufficient exposure value, is disordered to give a poorly orientated state. A negative C-plate is obtained owing to the irradiation with the unpolarized parallel light, but the thickness direction retardation is smaller than that in the region 130$a$.

In the region 130$e'$ which has been irradiated with an insufficient exposure value of linearly polarized light as the light L1, biaxiality composed of a positive A-plate and a negative C-plate is exhibited in the same manner as in the region 130$b'$. In comparison with the region 130$b'$, the region 130$e'$ has a smaller in-plane retardation and thickness direction retardation, but their Nz coefficients are almost equal.

In the region 130$f'$ which has been irradiated with an insufficient exposure value of linearly polarized light and an insufficient exposure value of unpolarized parallel light as the light L1, the nature of the orientation varies depending on the exposure value ratio between the linearly polarized light and unpolarized parallel light, and the total exposure value. More specifically, the nature of the orientation obtained in the region 130$a'$ and the nature of the orientation obtained in the region 130$b'$ are developed, whereby biaxiality composed of an A-plate and a negative C-plate is exhibited. The Nz coefficient is greater than in the region 130$b'$.

The exposure process may be performed by the above-described method. When a halftone mask is used in the first exposure process, the exposure values of the linearly polarized light and unpolarized parallel light applied to the respective regions may be controlled as desired. The halftone mask has a light shielding layer at a position corresponding to a specific region, and a semi-transmissive layer at a position corresponding to another region. Instead of the halftone mask, a gray-tone mask or a wavelength-limiting mask may be used. The gray-tone mask has the same structure as that of the halftone mask except that the semitransparent layer is omitted, and it includes a plurality of slits in the light-shielding layer in width equal to or smaller than the resolution of the light-exposure apparatus. The light-limiting mask includes portions different in wavelength range of light allowed to pass through.

As explained about the region 130$f'$, the desired biaxiality is obtained through the appropriate selection of the exposure value ratio between linearly polarized light and unpolarized parallel light and their total exposure value. That is, the Nz coefficient may be freely established. As is the case with linearly polarized light and unpolarized parallel light, irradiation with elliptically polarized light having different ellipticities gives the same result. For example, the irradiation with elliptically polarized light having an ellipticity of 2 corresponds to the irradiation with equal exposure values of linearly polarized light and unpolarized parallel light, and the irradiation with elliptically polarized light having an ellipticity greater than 2 corresponds to the irradiation wherein the exposure value of linearly polarized light is greater than that of unpolarized parallel light.

In the process of irradiation with linearly polarized light or elliptically polarized light, the axial direction of the polarized light applied to at least one region may be different from that of the polarized light applied to other region. As a result of this, in the subsequent first heat treatment process, the axial direction in the plane in which the refractive index reaches peak is different from that of the other region, corresponding to the azimuth of polarization axis of the linearly or elliptically polarized light.

As shown in FIG. 4, after different orientation states are established in the respective regions, the unreacted compound is polymerized and/or crosslinked, with the orientation state of the mesogen of the unreacted compound maintained.

Figure 7:
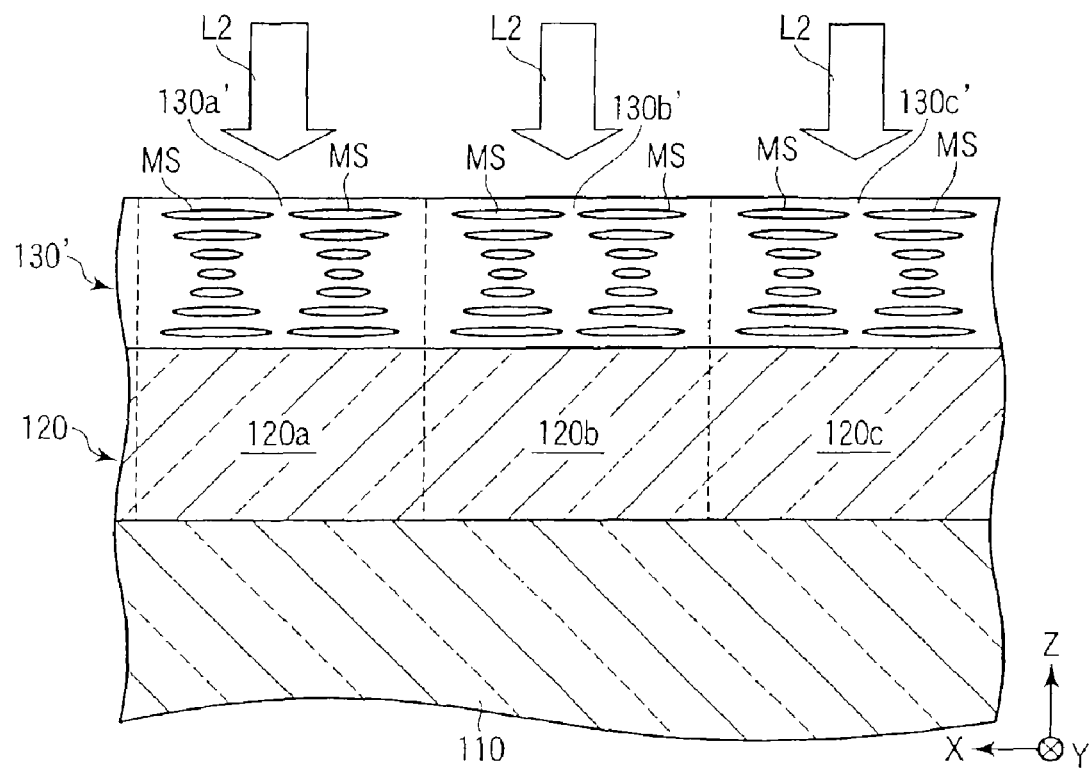
FIG. 7 is a sectional view schematically showing a process following the process shown in FIG. 4.

For example, the second exposure process shown in FIG. 7 is performed. That is, light L2 is applied over the entire liquid crystal material layer 130', with the liquid crystal material layer 130' kept at a temperature higher than the phase transition temperature at which the thermotropic liquid crystal compound changes from an isotropic phase to a liquid crystal phase.

The liquid crystal material layer 130' is irradiated with the light L2 with an exposure value sufficient for causing the polymerization and/or crosslinking reaction of almost all of the unreacted compound. As a result of this, the unreacted compound is polymerized or crosslinked, and the mesogen having a changed orientation state is immobilized. In this manner, the solidified liquid crystal layer 130 is obtained.

In a liquid crystal compound, the first phase transition temperature at which the compound changes from an isotropic phase to a liquid crystal phase is lower than the second phase transition temperature at which the compound changes from a liquid crystal phase to an isotropic phase. Therefore, in a particular case, the temperature of the liquid crystal material layer 130' in the second exposure process may be lower than the heating temperature in the first heat treatment process. In normal cases, in consideration of convenience, the temperature of the liquid crystal material layer 130' in the second exposure process is equal to or higher than the first phase transition temperature.

The light L2 may be polarized light, but unpolarized light is usually preferred from the viewpoint of convenience.

In the second exposure process, the entire surface of the liquid crystal material layer 130' may be irradiated with a uniform exposure value. In this case, the use of a photomask having a fine pattern is not necessary. As a result of this, the process is simplified.

The polymerization and/or crosslinking of the unreacted compound may be performed by another method.

For example, when the unreacted compound, or the thermotropic liquid crystal compound is a material which is polymerized and/or crosslinked by heating to a polymerization and/or crosslinking temperature higher than the first phase transition temperature, a second heat treatment process may be performed in place of the second exposure process. More specifically, in place of carrying out the second exposure process, the liquid crystal material layer 130' is heated to a temperature equal to or higher than the polymerization and/or crosslinking temperature, thereby polymerizing and/or crosslinking the unreacted compound. As a result of this, the solidified liquid crystal layer 130 is obtained. The heating temperature in the first heat treatment is, for example, equal to or higher than the first phase transition temperature, and below the polymerization and/or crosslinking temperature.

Alternatively, the second heat treatment process and the second exposure process may be performed in this order after the first heat treatment process. Alternatively, the second exposure process and the second heat treatment process may be performed in this order after the first heat treatment process. Further, the second heat treatment process, the second exposure process, and the second heat treatment process may be performed in this order after the first heat treatment process. The combination of the second exposure process and the second heat treatment process ensures the polymerization and/or crosslinking of the unreacted compound. As a result of this, the solidified liquid crystal layer 130 has a greater strength.

When the unreacted compound is a material which is polymerized and/or crosslinked upon heating to a certain temperature, the heating temperature in the first heat treatment may be equal to or higher than the temperature at which the unreacted compound is polymerized and/or crosslinked.

As explained above with reference to FIGS. 3 and 4, the retardation plate of the present invention may be manufactured with no wet process. Conditions of a wet process, in particular, a development is difficult to control precisely, and these conditions greatly affect the optical properties of the final product. For this reason, according to the method including a wet process, deviations of the optical properties from the target values prone to occur.

On the other hand, in the method of the present invention, no wet process is performed in the first exposure process or later. Therefore, it is possible to prevent the deviation of the refractive index anisotropy from the target value due to the wet process.

Note that the refractive index anisotropy and the exposure value in the first exposure process are not always in a proportional relation. However, under the conditions in which materials and the exposure values are unchanged, the reproducibility of the refractive index anisotropy is high. Therefore, the conditions, for example, an exposure value necessary for achieving certain refractive index anisotropy can be found out easily, and a stable manufacture can be done easily.

Various modifications can be made to the retardation plate 10 described with reference to FIGS. 1 to 4 and 7, i.e., a panel substrate.

In the retardation plate 10, the solidified liquid crystal layer 130 includes the regions 130a to 130c different in refractive index anisotropy. The solidified liquid crystal layer 130 may further include one or more regions different in refractive index anisotropy from the regions 130a to 130c. For example, in a semi-transparent liquid crystal display, each of the red, green and blue pixels includes a transmissive portion and a reflective portion. The transmissive portion and the reflective portion need to be designed separately. Therefore, each of the portions of the solidified liquid crystal layer 130 that correspond to the red, green and blue pixels may include two or more regions different in refractive index anisotropy from each other.

The color filter layer 120 may be omitted from the retardation plate 10. For example, in a liquid crystal display, one of the substrates may include both a color filter layer and a retardation layer. Alternatively, it is possible that one substrate of a liquid crystal display includes a color filter layer and the other substrate includes a retardation layer. In the latter case, it is not necessary that the retardation plate 10 includes the color filter layer 120. However, in the case where the retardation plate 10 includes both the color filter layer 120 and the solidified liquid crystal layer 130, an alignment between the color filter layer 120 and the solidified is unnecessary when bonding them together.

The solidified liquid crystal layer 130 may be interposed between the substrate 110 and the color filter layer 120.

Figure 8:
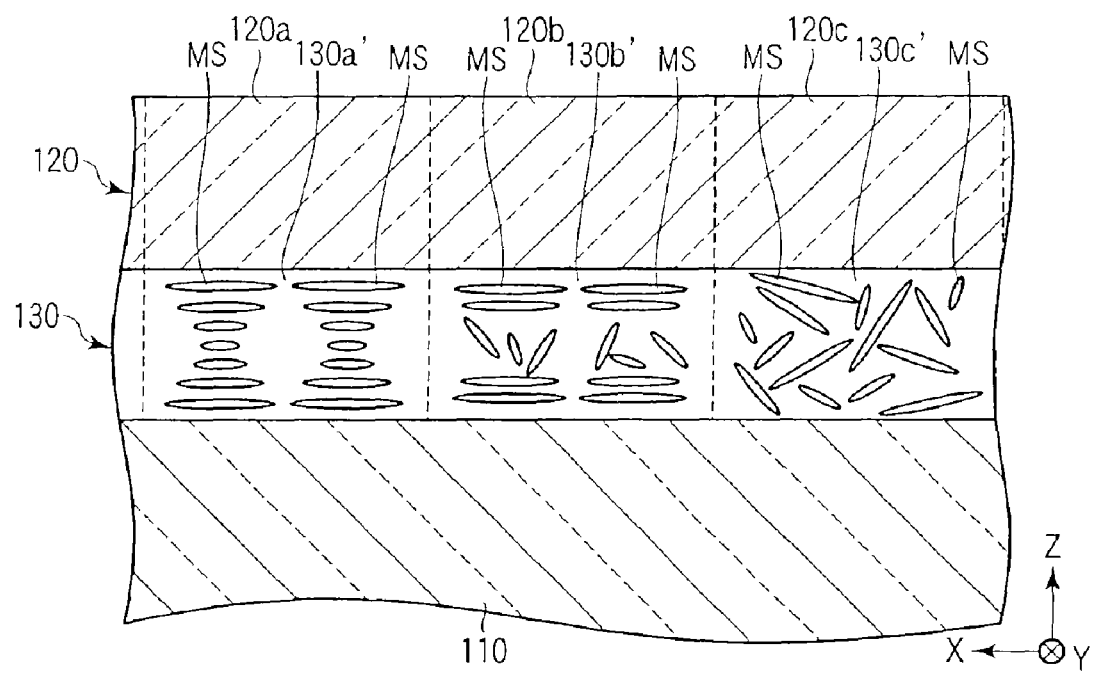
FIG. 8 is a sectional view schematically showing a retardation plate according to a modified example.

FIG. 8 is a sectional view schematically showing a retardation plate according to a modified example. This retardation plate 10 is the same as the retardation plate 10 described with reference to FIGS. 1 to 4 except that the solidified liquid crystal layer 130 is interposed between the substrate 110 and the color filter layer 120.

In the case where such a structure is employed, for example, in a liquid crystal display including the retardation plate 10, the solidified liquid crystal layer 130 does not suppress the inclusion of impurities from the color filter layer 120 into the liquid crystal layer. However, in the case where this structure is employed, there is no possibility that the color filter layer 120 is subjected to the exposure process and the heat treatment process for forming the solidified liquid crystal layer 130. Therefore, in the case where such a structure is employed, deteriorations of the color filter layer 120 due to the above-described exposure process and the heat treatment process are less prone to occur as compared with the case where the structure shown in FIGS. 1 and 2 is employed.

Further, in the case where this structure is employed, the color filter layer 120 can be formed on the solidified liquid crystal layer 130. Typically, the surface of the solidified liquid crystal layer 120 is roughly flat. Therefore, in this case, the color filter layer 120 that derivers the design performance can be obtained more easily as compared with the case where the color filter layer 120 is formed on a surface provided with a relief structure.

Typically, the solidified liquid crystal layer 130 has a uniform thickness. However, in particular cases, the regions 130a to 130c of the solidified liquid crystal layer 130 can be different in thickness from one another.

The above-described retardation plate 10 can be used for various applications. For example, the retardation plate 10 can be used in display techniques typified by a liquid crystal display technique.

Figure 9:
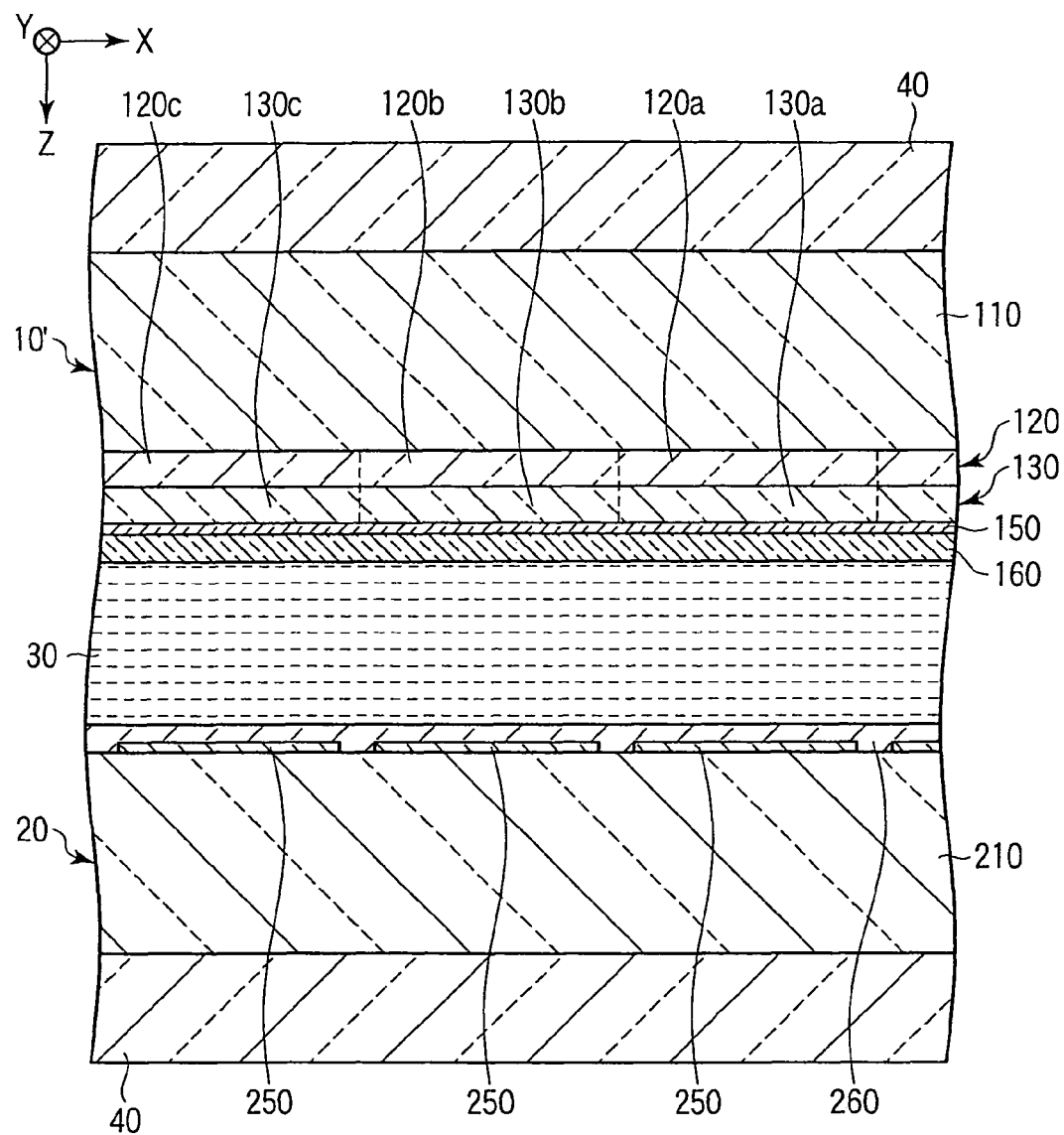
FIG. 9 is an example of a liquid crystal display that can be manufactured using the retardation plate shown in FIGS. 1 and 2.

FIG. 9 is a sectional view schematically showing an example of a liquid crystal display that can be manufactured using the retardation plate shown in FIGS. 1 and 2.

The liquid crystal display shown in FIG. 9 is a transmissive liquid crystal display employing an active matrix driving method. The liquid crystal display includes a color filter substrate 10', an array substrate 20, a liquid crystal layer 30, a pair of polarizing plates 40, and a backlight (not shown).

The color filter substrate 10' includes the retardation plate 10 described above, a counter electrode 150, and an alignment layer 160.

The counter electrode 150 is formed on the solidified liquid crystal layer 130. It is a continuous film extending over the display area. The counter electrode 150 is made of the above-described transparent conductor, for example.

The alignment layer 160 covers the counter electrode 150. Forming a transparent layer of resin such as polyimide on the counter electrode 150 and subjecting the transparent resin layer to an alignment process such as rubbing process can obtain the alignment layer 160, for example. The alignment layer 160 may be formed using a photo-alignment technique.

The array substrate 20 includes a substrate 210 facing the alignment layer 160. The substrate 210 is a light-transmitting substrate such as glass plate or resin plate.

On the surface of the substrate 210 facing the alignment layer 160, pixel circuits (not shown), scanning lines (not shown), signal lines (not shown), and pixel electrodes 250 are arranged. The pixel circuits each includes a switching device such as thin-film transistor and are arranged in a matrix on the substrate. The scanning lines are arranged correspondingly with the rows of the pixel circuits. The operation of each pixel circuit is controlled by a scanning signal supplied via the scanning line. The signal lines are arranged correspondingly with the columns of the pixel circuits. Each pixel electrode 250 is connected to the signal line via the pixel circuit. Each pixel electrode 250 faces one of the coloring layers 120a to 120c.

The pixel electrodes 250 are covered with an alignment layer 260. Forming a transparent layer of resin such as polyimide on the pixel electrode 250 and subjecting the transparent resin layer to an alignment process such as rubbing process can obtain the alignment layer 260, for example. The alignment layer 260 may be formed using a photo-alignment technique.

The color filter substrate 10' and the array substrate 20 are bonded together via a frame-shaped adhesive layer (not shown). The color filter substrate 10', the array substrate 20 and the adhesive layer form a hollow structure.

The liquid crystal layer 30 is made of a liquid crystal compound or a liquid crystal composition. The liquid crystal compound or the liquid crystal composition has flowability and fills the space enclosed with the color filter substrate 10', the array substrate 20 and the adhesive layer. The color filer substrate 10', the array substrate 20, the adhesive layer and the liquid crystal layer 30 form a liquid crystal cell.

The polarizing plates 40 are adhered to the main surfaces of the liquid crystal cell. The polarizing plates 40 are arranged such that their transmission axes intersect orthogonally, for example.

In the liquid crystal display, the regions 130a to 130c of the solidified liquid crystal layer 130 are almost equal in thickness to one another and are different in refractive index anisotropy from one another. Accordingly, it is possible to optimize the refractive index anisotropy of each of the regions 130a to 130c so as to achieve an ideal optical compensation for each of red, green and blue colors.

As described above, the retardation plate 10 can be used in a transmissive liquid crystal display employing an active matrix driving method. The retardation plate 10 can be used in other displays.

For example, the retardation plate 10 may be used in a semi-transparent liquid crystal display or a reflective liquid crystal display. Also, driving methods other than an active matrix driving method such as passive matrix driving method may be employed in the liquid crystal display. Alternatively, the retardation plate 10 may be used in displays other than liquid crystal displays such as organic electroluminescent display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A retardation plate comprising:
   a substrate;
   a solidified liquid crystal layer which is a continuous film made of a same material supported by the substrate, and has biaxial optical anisotropy, the solidified liquid crystal layer comprising a plurality of regions, the plurality of regions being arranged on the substrate and being different in in-plane retardation and thickness direction retardation,
   a number of the regions in the solidified liquid crystal layer being 3 or more, and
   the in-plane retardation of the solidified liquid crystal layer being the smallest in the first region and the greatest in the third region, and the Nz coefficient of the solidified liquid crystal layer being the greatest in the first region and the smallest in the third region; and
   a color filter layer which is interposed between the substrate and the solidified liquid crystal layer, or faces the substrate with the solidified liquid crystal layer interposed therebetween, the color filter layer comprising first to third coloring layers having different absorption spectra and facing the first to third regions, respectively, a wavelength of light transmissible through the color filter layer being the shortest in the first coloring layer, and the longest in the third coloring layer.

2. The retardation plate according to claim 1, wherein in at least one region of the solidified liquid crystal layer, an Nz coefficient represented by the formula (1) is different from those of other regions:

$$Nz=(n_x-n_z)/(n_x-n_y) \text{ formula (1)}$$

where $n_x$ is a maximum refractive index in the plane, $n_y$ is a minimum refractive index in the plane, and $n_z$ is a refractive index in a normal direction.

3. The retardation plate according to claim 1, wherein the Nz coefficients of the first to third regions are greater than 1.

4. The retardation plate according to claim 1, wherein any one of the first to third regions has an in-plane retardation of zero.

5. The retardation plate according to claim 1, wherein at least one of the first to third regions is different from other regions in an axial direction in which a refractive index in the plane is the highest.

6. The retardation plate according to claim 1, wherein the solidified liquid crystal layer has a uniform thickness.

7. The retardation plate according to claim 1, wherein the solidified liquid crystal layer is formed by polymerizing and/or crosslinking a thermotropic liquid crystal compound or composition in a state of an anisotropically disordered cholesteric alignment.

8. A liquid crystal display comprising:
first and second substrates facing each other;
a liquid crystal layer interposed between the first and second substrates;
a solidified liquid crystal layer supported by a main surface of the first substrate facing the second substrate, having biaxial optical anisotropy, and comprising first to third regions, the first to third regions being arranged on the substrate, an in-plane retardation of the solidified liquid crystal layer being the smallest in the first region and the greatest in the third region, an Nz coefficient of the solidified liquid crystal layer being the greatest in the first region and the smallest in the third region, and the solidified liquid crystal layer being formed as a continuous film composed of a same material; and
a color filter layer supported by the first or second substrate between the first and second substrates and comprising first to third coloring layers, the first to third coloring layers having different absorption spectra and facing the first to third regions, respectively.

9. The liquid crystal display according to claim 8, wherein a wavelength of light transmissible through the first to third coloring layers of the color filter layer is the shortest in the first coloring layer, and the longest in the third coloring layer.

10. A method for manufacturing a retardation plate, comprising forming a solidified liquid crystal layer on a substrate, the formation of the solidified liquid crystal layer comprising:
a step of forming a liquid crystal material layer on the substrate, the liquid crystal material layer comprising a photo-polymerizing or photo-crosslinking thermotropic liquid crystal compound, a chiral agent, and a dichroic photo-polymerization initiator, and mesogens of the thermotropic liquid crystal compound forming a cholesteric alignment structure;
a step of irradiating at least two regions of the liquid crystal material layer with different exposure values of linearly polarized light and different exposure values of unpolarized parallel light, thereby polymerizing or crosslinking at least a portion of the thermotropic liquid crystal compound with different proportions and different degrees of anisotropy to generate a polymerized or crosslinked product;
a subsequent step of heating the liquid crystal material layer to a temperature equal to or higher than a phase transition temperature at which the thermotropic liquid crystal compound changes from a liquid crystal phase to an isotropic phase, thereby changing an orientation state of the mesogens of the unreacted thermotropic liquid crystal compound in the at least two regions; and
a step of polymerizing and/or crosslinking the unreacted compound with the orientation state of the mesogens maintained.

11. The manufacturing method according to claim 10, wherein the irradiation of the at least two regions of the liquid crystal material layer with different exposure values of unpolarized parallel light is performed before the irradiation of the at least two regions of the liquid crystal material layer with different exposure values of polarized light.

12. The manufacturing method according to claim 10, wherein in the step of irradiating with linearly polarized light or elliptically polarized light, the irradiation is performed such that an azimuth of polarization axis in at least one of the regions is different from that in the other region.

13. The manufacturing method according to claim 10, wherein the liquid crystal material layer is formed as a continuous film having a uniform thickness.

14. The manufacturing method according to claim 10, wherein in the step of polymerizing and/or crosslinking the unreacted compound with the orientation state of the mesogens maintained, the polymerization and/or crosslinking reaction is induced by light irradiation.

15. The manufacturing method according to claim 14, wherein the light irradiation is performed by exposure of the entire surface of the liquid crystal material layer.

16. The manufacturing method according to claim 10, wherein the thermotropic liquid crystal compound is a material which is polymerized and/or crosslinked by heating to a polymerization and/or crosslinking temperature higher than the phase transition temperature, the orientation state of the mesogenic groups is changed by heating the liquid crystal material layer to a temperature below the polymerization and/or crosslinking temperature, and the unpolymerized and uncrosslinked thermotropic liquid crystal compound is polymerized and/or crosslinked by heating the liquid crystal material layer to a temperature equal to or higher than the polymerization and/or crosslinking temperature.

17. The manufacturing method according to claim 10, further comprising a step of forming a color filter layer on the substrate before the formation of the solidified liquid crystal layer, wherein the solidified liquid crystal layer is formed on the color filter layer directly or with another layer interposed therebetween.

18. The manufacturing method according to claim 10, further comprising a step of forming a color filter layer on the solidified liquid crystal layer.

19. A method for manufacturing a retardation plate, comprising forming a solidified liquid crystal layer on a substrate, the formation of the solidified liquid crystal layer comprising:
a step of forming a liquid crystal material layer on the substrate, the liquid crystal material layer comprising a photo-polymerizing or photo-crosslinking thermotropic liquid crystal compound, a chiral agent, and a dichroic photo-polymerization initiator, and mesogens of the thermotropic liquid crystal compound forming a cholesteric alignment structure;
a step of irradiating at least two regions of the liquid crystal material layer with elliptically polarized light having different ellipticities, thereby polymerizing or crosslinking at least a portion of the thermotropic liquid crystal compound with different proportions and different degrees of anisotropy to generate a polymerized or crosslinked product;
a subsequent step of heating the liquid crystal material layer to a temperature equal to or higher than a phase transition temperature at which the thermotropic liquid crystal compound changes from a liquid crystal phase to an isotropic phase, thereby changing an orientation state of the mesogens of the unreacted thermotropic liquid crystal compound in the at least two regions; and
a step of polymerizing and/or crosslinking the unreacted compound with the orientation state of the mesogens maintained.

20. The manufacturing method according to claim 19, wherein in the step of irradiating with linearly polarized light or elliptically polarized light, the irradiation is performed such that an azimuth of polarization axis in at least one of the regions is different from that in the other region.

21. The manufacturing method according to claim 19, wherein the liquid crystal material layer is formed as a continuous film having a uniform thickness.

22. The manufacturing method according to claim 19, wherein in the step of polymerizing and/or crosslinking the unreacted compound with the orientation state of the mesogens maintained, the polymerization and/or crosslinking reaction is induced by light irradiation.

23. The manufacturing method according to claim 22, wherein the light irradiation is performed by exposure of the entire surface of the liquid crystal material layer.

24. The manufacturing method according to claim 19, wherein the thermotropic liquid crystal compound is a material which is polymerized and/or crosslinked by heating to a polymerization and/or crosslinking temperature higher than the phase transition temperature, the orientation state of the mesogenic groups is changed by heating the liquid crystal material layer to a temperature below the polymerization and/or crosslinking temperature, and the unpolymerized and uncrosslinked thermotropic liquid crystal compound is polymerized and/or crosslinked by heating the liquid crystal material layer to a temperature equal to or higher than the polymerization and/or crosslinking temperature.

25. The manufacturing method according to claim 19, further comprising a step of forming a color filter layer on the substrate before the formation of the solidified liquid crystal layer, wherein the solidified liquid crystal layer is formed on the color filter layer directly or with another layer interposed therebetween.

26. The manufacturing method according to claim 19, further comprising a step of forming a color filter layer on the solidified liquid crystal layer.

27. A retardation plate comprising:
a substrate; and
a solidified liquid crystal layer which is a continuous film made of a same material supported by the substrate, and has biaxial optical anisotropy, the solidified liquid crystal layer comprising a plurality of regions, the plurality of regions being arranged on the substrate and being different in in-plane birefringence and thickness direction birefringence,
  a number of the regions in the solidified liquid crystal layer being 3 or more, and
  the in-plane birefringence of the solidified liquid crystal layer being the smallest in the first region and the greatest in the third region, and the Nz coefficient of the solidified liquid crystal layer being the greatest in the first region and the smallest in the third region;
a color filter layer which is interposed between the substrate and the solidified liquid crystal layer, or faces the substrate with the solidified liquid crystal layer interposed therebetween, the color filter layer comprising first to third coloring layers having different absorption spectra and facing the first to third regions, respectively,
a wavelength of light transmissible through the color filter layer being the shortest in the first coloring layer, and the longest in the third coloring layer.

28. The retardation plate according to claim 27, wherein in at least one region of the solidified liquid crystal layer, an Nz coefficient represented by the formula (1) is different from those of other regions:

$$Nz=(n_x-n_z)/(n_x-n_y) \text{ formula (1)}$$

where $n_x$ is a maximum refractive index in the plane, $n_y$ is a minimum refractive index in the plane, and $n_z$ is a refractive index in a normal direction.

29. The retardation plate according to claim 27, wherein the Nz coefficients of the first to third regions are greater than 1.

30. The retardation plate according to claim 27, wherein any one of the first to third regions has an in-plane retardation of zero.

31. The retardation plate according to claim 27, wherein at least one of the first to third regions is different from other regions in an axial direction in which a refractive index in the plane is the highest.

32. The retardation plate according to claim 27, wherein the solidified liquid crystal layer has a uniform thickness.

33. The retardation plate according to claim 27, wherein the solidified liquid crystal layer is formed by polymerizing and/or crosslinking a thermotropic liquid crystal compound or composition in a state of an anisotropically disordered cholesteric alignment.

* * * * *

UNITED STATES PATENT AND TRADEMARK OFFICE
CERTIFICATE OF CORRECTION

| | | |
|---|---|---|
| PATENT NO. | : 8,284,357 B2 | Page 1 of 1 |
| APPLICATION NO. | : 12/923616 | |
| DATED | : October 9, 2012 | |
| INVENTOR(S) | : Sosuke Akao et al. | |

It is certified that error appears in the above-identified patent and that said Letters Patent is hereby corrected as shown below:

Column 27, Line 28, In Claim 25, delete "interposeed" and insert -- interposed --, therefor.

Signed and Sealed this
Nineteenth Day of March, 2013

Teresa Stanek Rea
*Acting Director of the United States Patent and Trademark Office*